United States Patent
Torre et al.

(10) Patent No.: US 10,940,925 B2
(45) Date of Patent: Mar. 9, 2021

(54) AUTOMATED DOCK POSITIONING SYSTEM

(71) Applicants: Phillip George Torre, Lebanon, IL (US); Thomas H. Torre, Dawsonville, GA (US)

(72) Inventors: Phillip George Torre, Lebanon, IL (US); Thomas H. Torre, Dawsonville, GA (US)

(73) Assignee: Ottomation, LLC, Dawsonville, GA (US)

( * ) Notice: Subject to any disclaimer, the term of this patent is extended or adjusted under 35 U.S.C. 154(b) by 0 days.

(21) Appl. No.: 16/274,386

(22) Filed: Feb. 13, 2019

(65) Prior Publication Data

US 2020/0255105 A1    Aug. 13, 2020

(51) Int. Cl.
| | |
|---|---|
| *B63C 1/02* | (2006.01) |
| *G05D 3/20* | (2006.01) |
| *B63B 35/44* | (2006.01) |
| *H04L 29/08* | (2006.01) |

(52) U.S. Cl.
CPC .............. *B63C 1/02* (2013.01); *B63B 35/44* (2013.01); *G05D 3/20* (2013.01); *H04L 67/34* (2013.01)

(58) Field of Classification Search
CPC ......... B63B 35/00; B63B 35/34; B63B 35/44; B63B 21/00; B63B 21/50; B63C 1/00; B63C 1/02; G05D 3/00; G05D 3/20; H04L 67/34
USPC .............. 114/230.23, 230.27, 263; 405/219
See application file for complete search history.

(56) References Cited

U.S. PATENT DOCUMENTS

| | | | | | |
|---|---|---|---|---|---|
| 3,088,287 | A | * | 5/1963 | Berry | B63B 35/44 114/263 |
| 3,492,825 | A | * | 2/1970 | Pearson | E01D 15/24 405/219 |
| 6,295,944 | B1 | * | 10/2001 | Lovett | E02B 3/064 114/263 |
| 8,336,478 | B2 | * | 12/2012 | Craft | B63B 35/44 114/263 |

* cited by examiner

*Primary Examiner* — Lars A Olson
(74) *Attorney, Agent, or Firm* — Todd A Serbin; Nexsen Pruet, LLC

(57) ABSTRACT

A computer controlled robotic system that autonomously adjusts the location of a floating marine dock whenever water levels change in a body of water (e.g., a lake or reservoir) to maintain sufficient draft clearance for safe boat operation and ensure safe access to the dock. The system is comprised of an electric motor-driven tractor device attached to the shore-end of a walkway and a pair of electric-motor driven cable winch assemblies with a distributed control system to move the floating dock toward or away from the shore to maintain a relative desired water depth for safe boat operation and positioning in relation to the moving edge of the water shoreline. The tractor and winch motions are controlled by a combination of on-board (dockside) microprocessor and web-based computing that utilizes software to process location telemetry from distance measuring sensors such as Light Detection and Ranging (LIDAR) sensors, Global Positioning System (GPS) data, and a compass bearing to calculate the incremental actuations of the tractor and winch motors. FIG. 1 depicts the system's main elements installed on a marine dock floating near the water's edge (shoreline).

19 Claims, 23 Drawing Sheets

| Dock Serial No. | GPS Location deg. | Compass Bearing deg. | Altitude ft. | Topology Registration | Water Depth min. ft. | Position Tolerances | | Move History | | | | |
|---|---|---|---|---|---|---|---|---|---|---|---|---|
| | | | | | | Angularity deg. | Distance in. | Date | UI Resp yes | UI Resp no | CL Dev. deg. | Dist. in. |
| 0001 | 33.7651°N 86.5342°W | 306° NW | 271 | T-0001 | 4.6 | 0.05 | 3.50 | 3/3/2019 | ack | | +0.12 | +8.7 |
| 0017 | 26.8933°N 78.6473°W | 265° NW | 438 | T-0017 | 6.3 | 0.04 | 4.12 | 4/30/2019 | | dec | - | - |
| 0017 | 26.8933°N 78.6473°W | 265° NW | 438 | T-0017 | 6.3 | 0.04 | 4.12 | 5/10/2019 | ack | | -0.06 | -10.5 |
| 0012 | 35.6324°N 89.5474°W | 292° NW | 177 | T-0012 | 4.2 | 0.05 | 4.25 | 5/31/2019 | ack | | +0.06 | +5.6 |
| 0006 | 38.3249°N 92.4778°W | 299° NW | 443 | T-0006 | 7.2 | 0.05 | 3.50 | 6/17/2019 | ack | | -0.07 | -8.2 |
| 0051 | 34.6623°N 85.8326°W | 301° NW | 331 | T-0051 | 5.2 | 0.04 | 3.50 | 7/3/2019 | | dec | - | - |
| 0006 | 38.3249°N 92.4778°W | 299° NW | 443 | T-0006 | 7.2 | 0.05 | 3.50 | 8/13/2019 | ack | | +0.07 | +7.7 |
| 0051 | 34.6623°N 85.8326°W | 301° NW | 331 | T-0051 | 5.2 | 0.04 | 3.50 | 8/15/2019 | ack | | +0.11 | +8.5 |
| 0036 | 41.9056°N 77.3893°W | 288° NW | 177 | T-0036 | 9.1 | 0.05 | 3.75 | 8/19/2019 | ack | | -0.08 | -8.1 |
| 0036 | 41.9056°N 77.3893°W | 288° NW | 177 | T-0036 | 9.1 | 0.05 | 3.75 | 9/27/2019 | ack | | +0.08 | +8.6 |
| 0012 | 35.6324°N 89.5474°W | 292° NW | 177 | T-0012 | 4.2 | 0.05 | 4.25 | 10/2/2019 | ack | | -0.09 | -4.7 |

Figure 12.

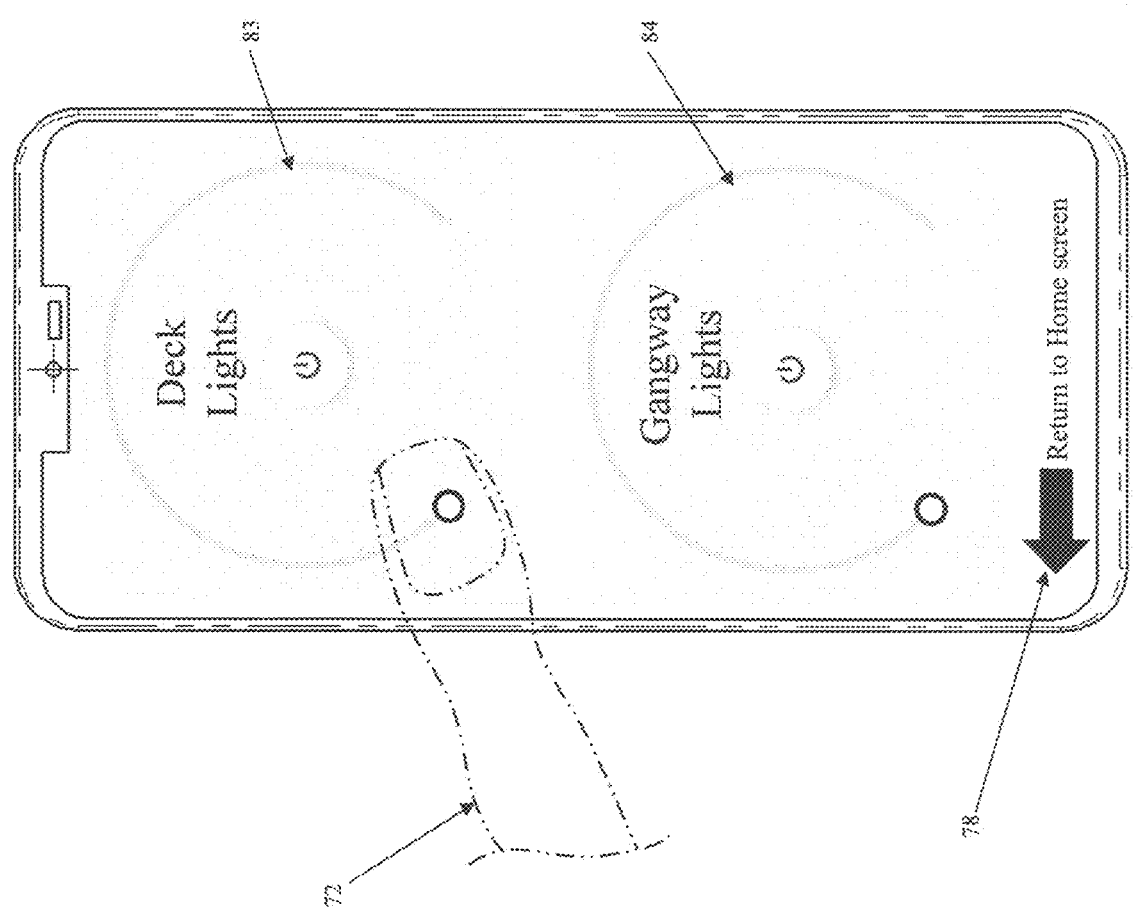

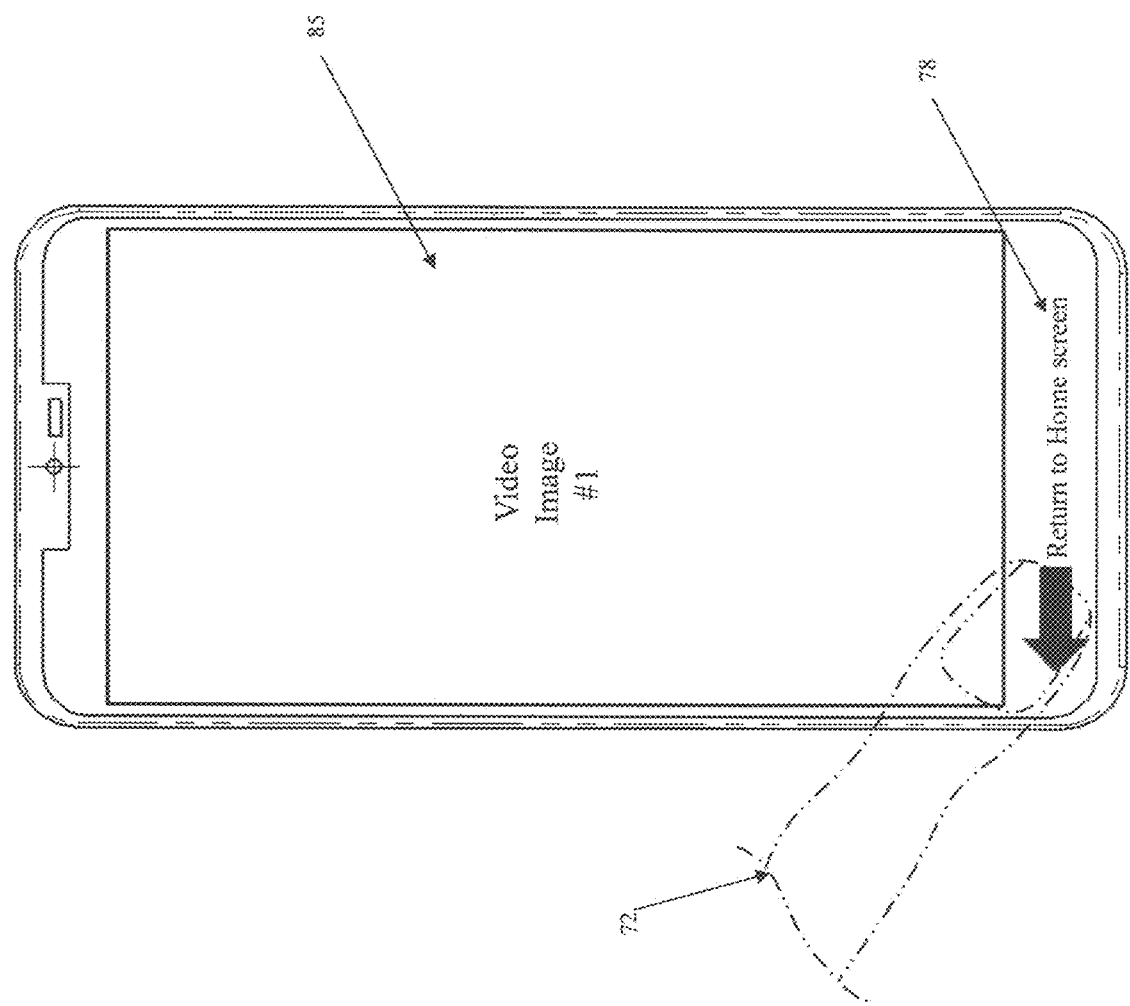

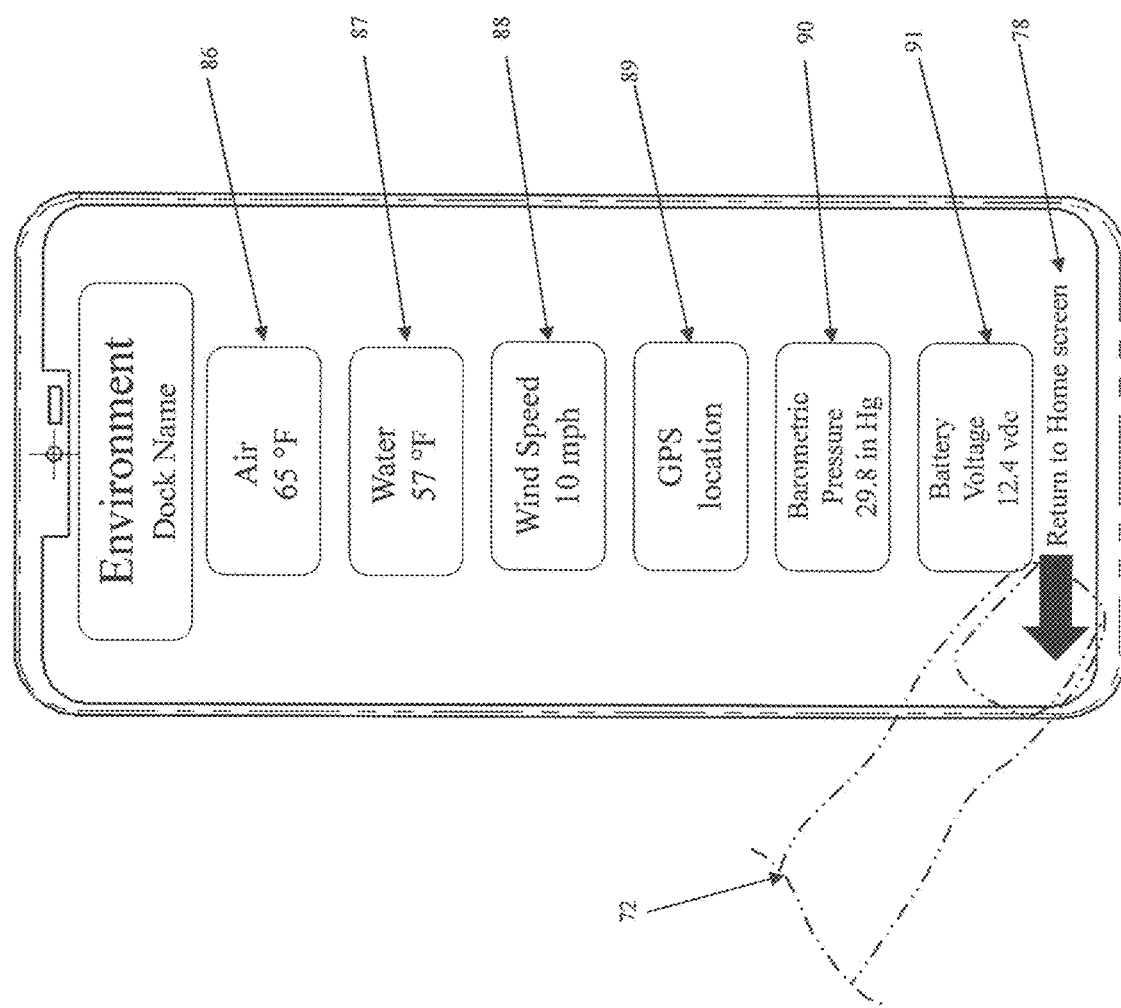

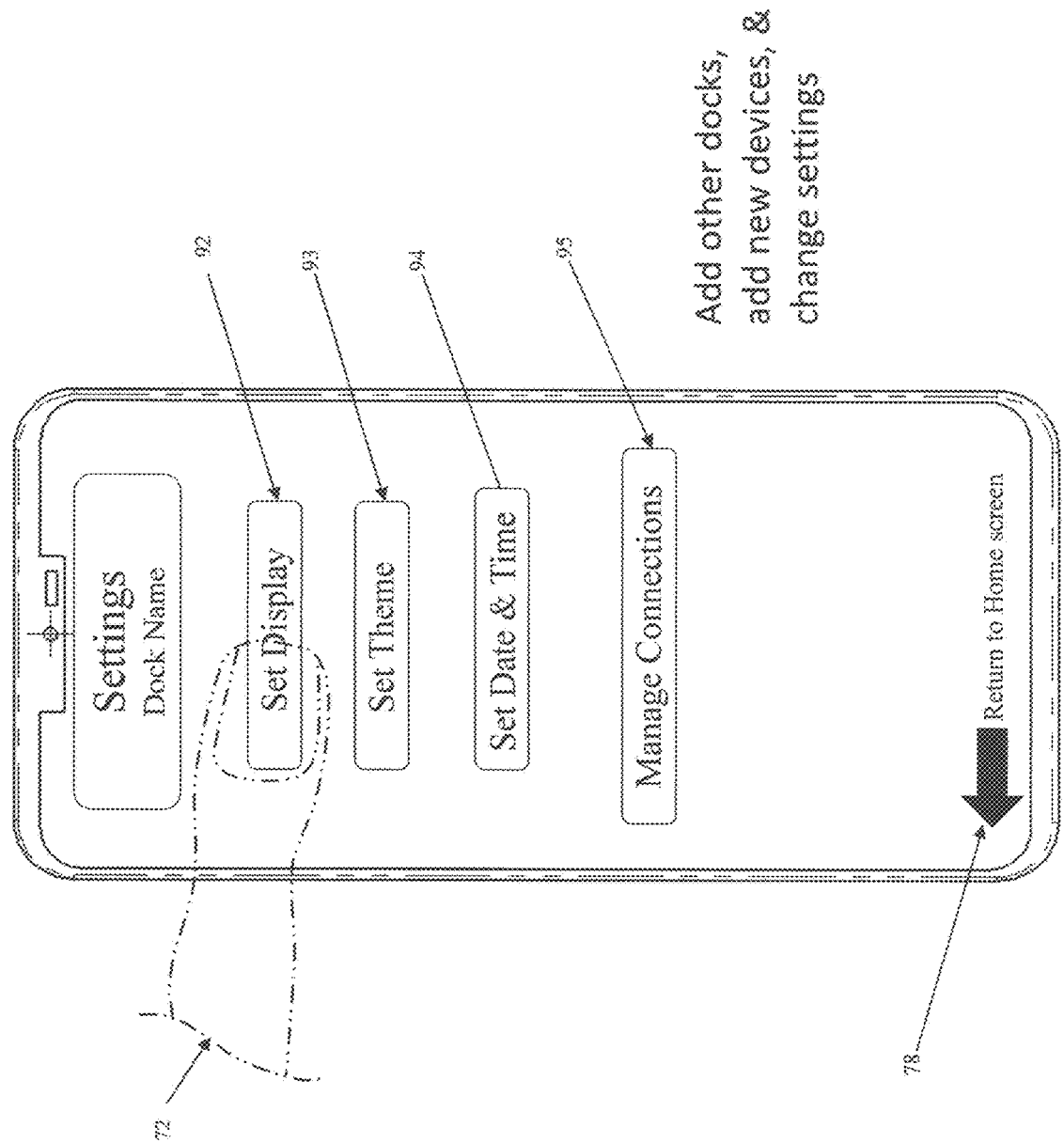

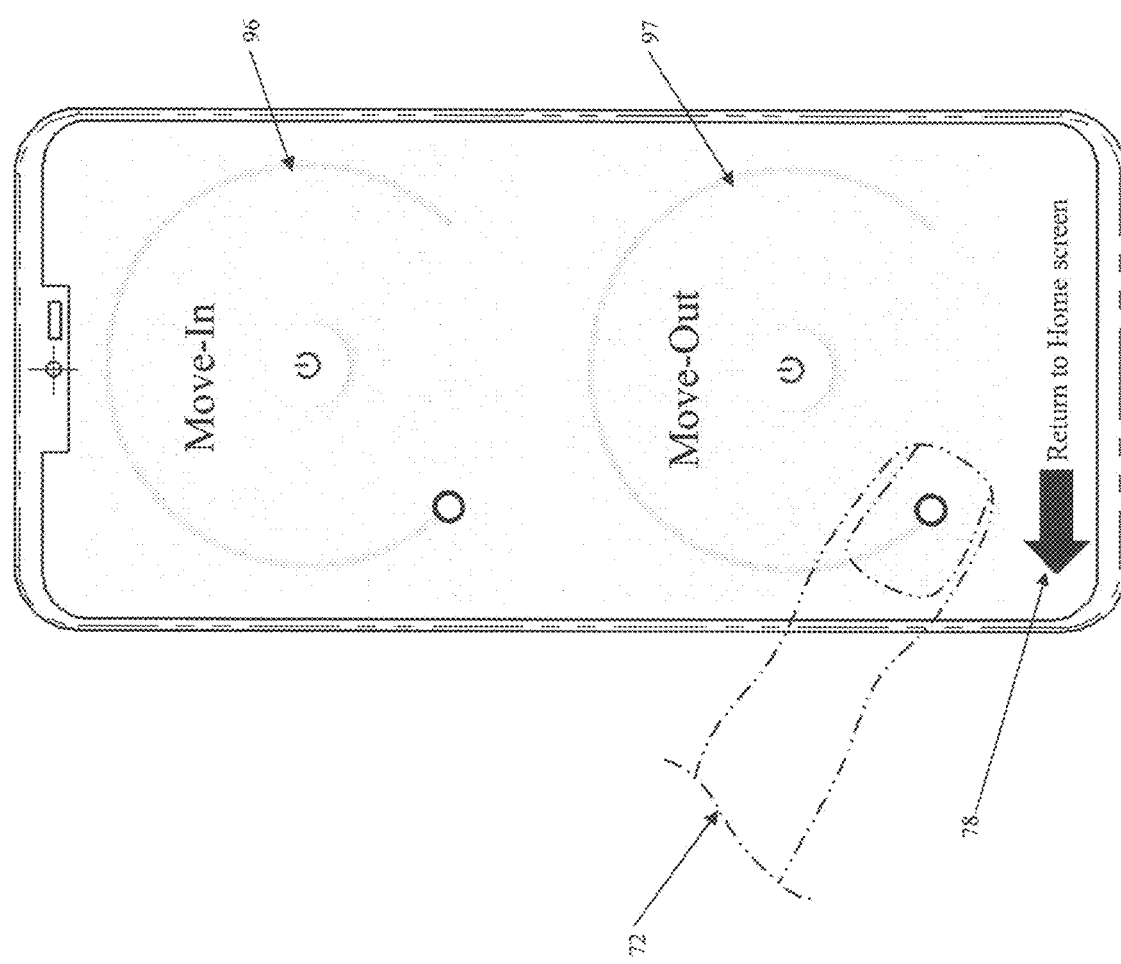

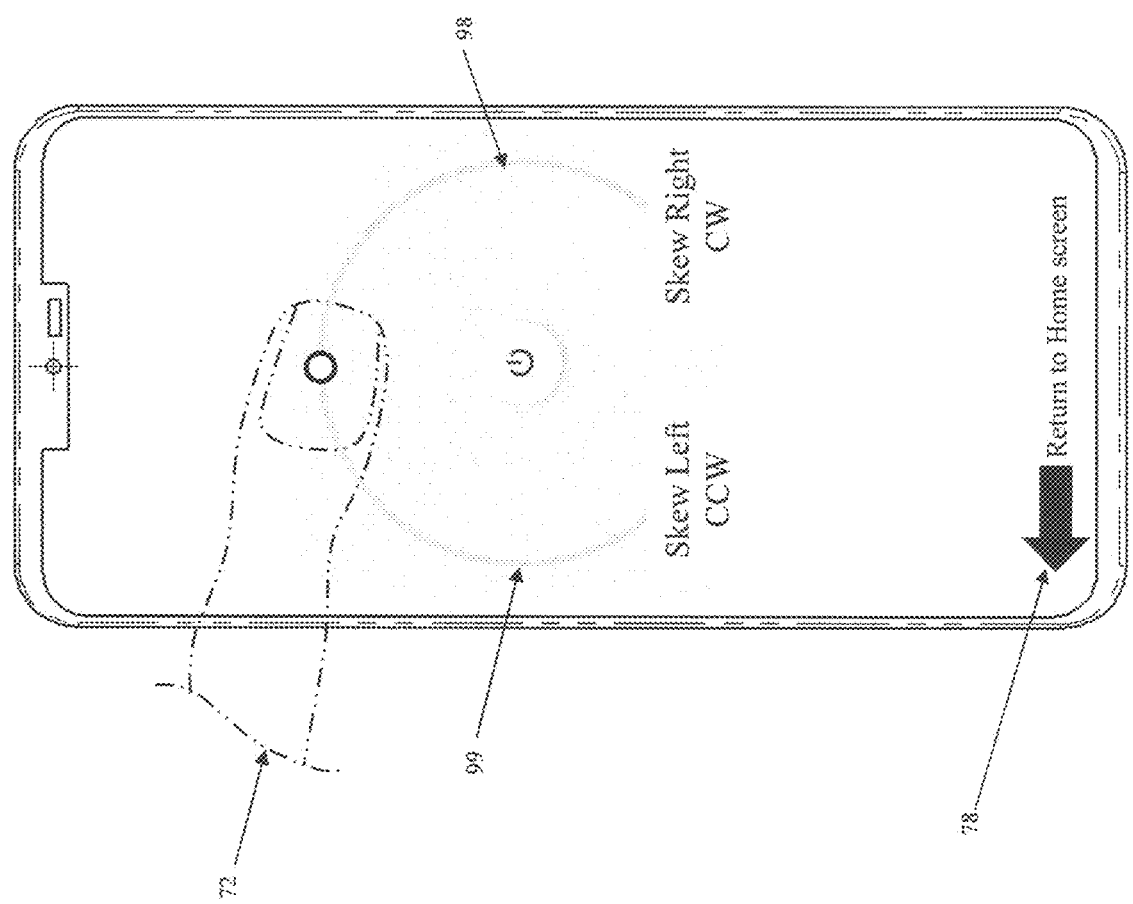

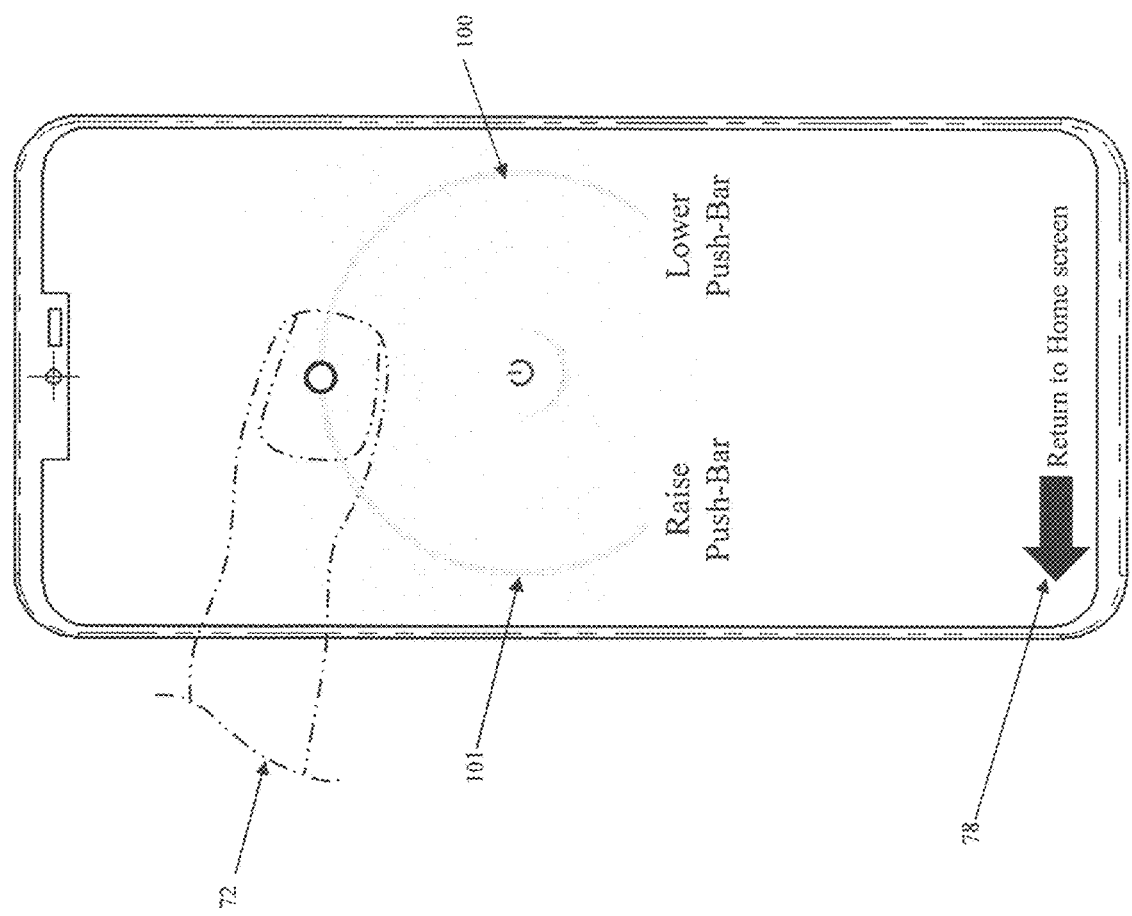

AUTOMATED DOCK POSITIONING SYSTEM

REFERENCES CITED
Prior Art - U.S. Patent Documents

| | | |
|---|---|---|
| 3,050,947 | Aug. 28, 1962 | J. E. Burton |
| 3,088,287 | May 7, 1963 | V. C. Berry |
| 3,276,211 | Oct. 4, 1966 | T. R. Drake |
| 3,683,838 | Aug. 15, 1972 | B. L. Godbersen |
| 5,238,324 | Aug. 24, 1993 | M. Dettling, Jr. |
| 5,282,435 | Feb. 1, 1994 | H. S. Chapman |
| 6,295,944 | Oct. 2, 2001 | J. T. Lovett |
| 8,336,478 | Dec. 25, 2012 | K. T. Craft |
| 8,596,211 | Dec. 3, 2013 | L. L. Ramey & R. H. Dawkins |
| 9,233,735 | Jan. 12, 2016 | L. L. Ramey & R. H. Dawkins |

OTHER PUBLICATIONS
LazyA Dock Movers, LLC/Phone 864-338-4600 (or) 864-617-7881, 508 River St., Belton, SC 29627/website = www.lazydock.com.

BACKGROUND

1. Field of Invention

This invention relates to a new and useful method to autonomously control the location of a floating dock and associated gangway in relation to the water's edge (shoreline) that moves up and down the embankment of a body of water due to the rise and fall of reservoir or lake water levels. The dock position can also be controlled manually by a dock owner via a remote, downloadable mobile application.

This present invention is a unique automatic method of positioning a floating dock to prevent being beached by elevation changes in water level. This autonomous device will provide sufficient water depth for peace of mind and safety to boat owners, especially in places where water level elevation changes are a frequent occurrence. This device will move the dock away from shore as the water level subsides and automatically move the dock towards the shore as the water rises, thus maintaining a consistent distance between the shallow end of the dock and the shoreline so that a walkway of a given length can be appropriately used as a bridge to the dock under all conditions and maintain sufficient water depth for boat draft protection.

2. Discussion of Prior Art

Owners of floating docks periodically tend the location of their floating docks due to fluctuations in the water level which changes the position of the water's edge along the shore. If the dock is not relocated, then it can become inaccessible, unstable, beached or unmoored.

When the water level goes down, the shoreline recedes toward the main body of water which can cause the dock to settle on the lake-bottom ground if it is not relocated further out on the water. When the water level rises, the shoreline returns toward the beach. This increase in water can cause the dock to become unmoored or the gangway swamped if it is not relocated. Therefore, it is necessary for dock owners to maintain the floating dock at a relatively constant distance from the water's edge. This allows access to the dock walkway from the shore as well as access to the entire dock for swimming, boating and other recreational purposes. In order for a floating dock to be continually accessible, it is necessary to move the dock in a direction normal (orthogonal) to the body of water as the water level changes.

Traditionally, floating docks are kept in place along the shore of a body of water with steel cables and anchor posts wherein one cable is mounted to each dock corner closest to the shore and the opposite end is attached to shore anchor posts above the high-water level. Hand operated winches on the dock corners are used to control the length of the cables to adjust the dock position as the water level fluctuates. This invention provides a fully autonomous, self-regulating means of dock positioning. Throughout this patent the "system" consists of a computerized logic controller with software to interpret the dock's position using distance measuring sensors (such as LIDAR) and GPS location signals that drive the combination of winches with cables and a tractor with an integral drive mechanism. A solar-panel with an associated battery located on the dock provides the electrical power source for all equipment. From a reference point on a dock used in conjunction with data from other external sources, the system controls the placement and orientation of the floating dock. Latitude and longitude coordinates from GPS are used together with distance measurements, magnetic bearing orientation, and water level indication from commercial internet-connected web sources. Additional environmental factors such as wind speed, barometric pressure, temperature, and pitch, roll and yaw, also provide deterministic factors to govern the movement of the dock assembly.

There are prior systems that enable dock positional changes, but they are manually operated, time-consuming, and, if left unattended, would permit a floating dock and walkway to drift as the water level changes. It is common among docks that require relocating to utilize the two hand cranks that manually operate the cable winches. This method requires frequent effort to move the dock toward the shore and maintain a desired perpendicular path to shoreline. To relocate a dock away from shore, the manually operated winches securing the dock to the shore are released, thereby relaxing the cables that secure it to the shore. Then, by manually pushing the walkway and dock assembly toward the body of water, the dock assembly moves away from the shoreline. This manual process of moving the dock assembly is difficult and typically requires a plurality of people. Windy and strong current conditions also make it difficult to move without additional manual help.

U.S. Pat. No. 3,050,947 (1962) to Burton involves a stationary shore supported stairway 10, an articulated walkway 12, and boat dock platform 14 anchored at the top shoreline and to the bottom of the body of water. Because it utilizes a permanent anchor to the bottom of the body of water, the stairway would not be permitted on many lakes and reservoirs. Furthermore, this patent would not be practical if the beach angle and slope of the dirt just below the shoreline is at a low angle. A 10 feet water level drop may require a guide mechanism and stairway over 100 feet in length. Furthermore, the bottom engaging anchor 152, freeweight 148, and chain 144 are safety concerns to swimmers and recreational vehicles.

U.S. Pat. No. 3,088,287 to Berry (1963) frame 10 and base 13 are not permitted on many bodies of water because no portion of the dock are allowed to contact the ground surface of the beach or below the body of water. In addition, the guide rails are not practical for lakes or bodies of water that have a low angle of beach because they would have to be long in length. This patent will work for a steep beach angle, but not for a gradual slope of beach and shoreline. There are many dock locations where the water level may drop 10 feet or more and the shoreline moves inward toward the main body of water as much as 100 feet. To work, this patent stairway 16 would need to be over 100 feet in length to compensate for a 10 feet drop in water level. This would not be practical.

U.S. Pat. No. 3,276,211 to Drake (1966) does not allow for horizontal relocation of a dock relative to a shoreline, but rather describes a system of improved flotation for seagoing dry dock construction.

U.S. Pat. No. 3,683,838 to Godbersen (1972) utilizes anchor points secured to the bottom land beneath the body of water by anchor 58. This would not be permitted on many lakes and reservoirs that require only floating docks. Chains 13 is a potential safety hazards for boaters, swimmers, and other water recreation.

U.S. Pat. No. 5,238,324 to Dettling, Jr. (1993) provides a portable boat dock and boat lift that can be used to relocate the wheeled boat dock and lift to another accessible shore area of the body of water. It has a ball receiver end 66 for connecting to a towing vehicle. It is not a dock mover that is easily moved in and outward from the shoreline. The anchor system is manually positioned by 59 and 60 stake members and therefore not practical for relocating a dock due to changing water levels. Additionally, it is not tethered to the shore with cables or the like and in windy conditions can easily get turned and move off of a perpendicular position to the shoreline.

U.S. Pat. No. 5,282,435 to Chapman (1994) has a ratchet 26 that is made to touch and drag the surface along the bottom of the body of water. This will disturb the land below the water and eventually wear a pathway groove in the bottom surface 30.

U.S. Pat. No. 6,295,944 to Lovett (2001) utilizes a constant force spring mechanism to provide the force necessary to maintain a floating dock at a more or less constant position. This would be impractical if the traveling distance was more than a few feet in either direction, or a steep inclination. Slippage of the tires in mud or slick bottom would release the spring pressure and the boat dock many not move. Upon slippage, hand crank 20 is used to input additional spring tension. Manually inputting additional spring pressure utilizing hand crank 20 would be difficult to provide enough spring force to allow the boat dock to move up a steep beach.

U.S. Pat. No. 8,336,478 B2 to Craft (2010) involves a system of a motorized pair of wheels or optional caterpillar-type crawler device on the shore-end of a dock walkway and cable winch system that are electrically controlled that necessitates operator(s) action and attention to the rising or falling water level. It is not autonomous.

U.S. Pat. No. 8,596,211 B2 to Ramey and Dawkins (2013) involves a manually-operated cable winch system with a motorized set of wheels on the walkway and a manual ramp lift system that is manually manipulated via a set of switches on a control panel. This necessitates operator(s) action and attention to the rising or falling water level. It is not autonomous. Additionally, it shows that lower anchor arm 57 and rod 59 must be secured to the bottom of the body of water, which is not be permitted on most lakes and reservoirs requiring boating docks.

U.S. Pat. No. 9,233,735 B2 to Ramey and Dawkins (2016) involves a manually-operated cable winch system with a motorized set of wheels on the walkway and a manual ramp lift system that is manually manipulated via a set of switches on a control panel. This necessitates operator(s) action and attention to the rising or falling water level. It is not autonomous. Additionally, it shows that lower anchor arm 57 and rod 59 must be secured to the bottom of the body of water, which is not be permitted on most lakes and reservoirs requiring boating docks.

OBJECTS AND ADVANTAGES

Accordingly, several objects and advantages of the embodiment of this computer controlled, autonomous floating dock mover are:

a) To provide a vast improvement over prior art in design, construction, and ease of use by automatically controlling the location of a floating dock assembly to ensure proper water depth beneath the dock when a lake or reservoir water level increases and decreases;

b) To provide a method to independently provide electrical power to the system to move the dock to a new location from a power generation system that is self-contained on the floating dock;

c) To provide an easy-to-use user mobile interface that enables a dock owner to remotely monitor and control the position of the floating dock;

d) To maintain the position of the walkway to a floating dock so that it can be safely used as a bridge to ingress or egress the dock under all conditions; and e) To maintain sufficient water depth for boat draft protection. Additional objects and advantages will become apparent from a consideration of the ensuing summary, drawings and description.

SUMMARY OF THE INVENTION

The present invention relates to a combination of devices to autonomously relocate a floating dock whenever the water level increases or decreases in a lake or reservoir. To continue to be usable with changes in water level, the floating dock must maintain adequate distance from the edge of the waterline that is on the shore. When the water level decreases, the waterline moves toward the main body of water and the floating dock should be moved or it will settle on the dry ground. When the water level increases, the waterline moves away from the main body of water and the floating dock should then also be moved toward the waterline or it will become isolated on the body of water and not allow access from the shore. Our proposed invention will prevent the occurrence of these events and ensure that the dock will never be beached and access will always be ensured.

It is the goal of the present invention to maintain a floating dock at a nearly constant position and orientation relative to the moving waterline on the shore. This can easily be done by the embodiment of our proposed automated dock positioning system using computer-controlled electrical circuitry to switch electrical motors on winch reels that make adjustments to the shore anchoring cable lengths and the tractor push bar extension device onto the water body lakebed (ground) which controls the position and orientation of the dock in relation to the waterline on the shore.

This present invention operates by means of a plurality of electro-mechanical subsystems that are computer controlled:

(1) One robotic tractor is mounted to the end of a dock walkway on the shore and consists of a motor-driven extendable bar that lowers down onto the lakebed and pushes against the ground. This pushing motion, axially along the centerline of the dock walkway, causes the floating dock to move away from the shore. Once extended, when in direct contact with the earth, it then also serves as a fixed anchor point for the floating dock. When further movement away from the shore is needed, the extendable bar can cycle through a series of extend and retract sequences, be lifted up away from the lakebed, and then extended again toward the ground to push the dock to a new position. When movement toward the shore is needed, the extendable bar can be retracted and lifted up to provide clearance so the motorized winches can reel-in an incremental length of cable to pull the floating dock toward the shore.

(2) Two electric motor-driven winches with cable reels are mounted on both the port and starboard land-facing corners of the floating dock with pivoting arms that allow alignment of the cable to the anchor points on the shore. These winches are driven independently to provide alignment of the floating dock orthogonally to the shore of the body of water. Movement of the entire dock assembly toward the shore as the water level rises is achieved through coordinated parallel control of both the port and starboard winches. As in the traditional anchoring of floating dock systems, the cable end of the automated winch assembly is permanently attached to fixed anchor points on land. When the Tractor push bar is actuated to push the dock away from the shore then the winches can reverse the cable feed to facilitate outward movement.

(3) An electronic computer system is mounted in a waterproof enclosure on the floating dock to accumulate GPS location signals, LIDAR positional data, and inputs from environmental sensors. Using the data collected, the computer system calculates the placement and orientation of the floating dock and sends signals to relays to electrically activate the motors on the winches and the tractor extendable push bar. Other environmental indications such as wind speed, barometric pressure, temperature, and accelerometer-indicated pitch, roll and yaw movements, together with a real-time link to video observations of the dock surrounds provide inputs to decisions made by the computer about whether it is safe to automatically move the floating dock. The software programming functionality is further described in the following description of drawings and the preferred embodiment of the invention.

(4) A separate software application that is downloadable onto any internet connected mobile device (phone, tablet or computer) that allows human and application logic interaction with the computer on the floating dock via an internet connection to provide the dock owner with a user interface to remotely observe live video images of the dock surrounds, monitor environmental conditions and observe or command the relative dock position. The application enables the use of voice or screen touch hand gestures (or mouse) to interact with the control subsystems for actuation capability by a user to:

a) toggle between different video images generated by cameras mounted variously on the dock;

b) visually read real-time environmental weather conditions such as air temperature, wind speed, water temperature and barometric pressure that are provided by local sensors on the dock;

c) slide the position of the winch and tractor motion controls should the owner choose to manually override the automatic positioning system to move the dock to a new position by sliding a finger along a bar on the screen to move the dock toward or away from the shore; and d) slide a finger along a choice of bars to adjust the lighting levels of lights installed in various locations on the dock.

The user interface features that are programmed for the mobile application functionality are further described in the following description of drawings and the preferred embodiment of the invention.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

DESCRIPTION OF THE DRAWINGS

A preferred form of the embodiment of this computer-controlled autonomous floating dock mover is illustrated in the accompanying drawings. It should be noted that the appended drawings are not necessarily to scale.

FIG. 12 is a depiction of the database table that is maintained on the internet network of the movement history and UI response of each dock system serial number.

FIG. 17 shows a view of the fourth available screen of the dock owner's remote application interface which depicts finger actuated rotational sliders to brighten or dim the various dock lights.

FIG. 18 shows a view of one of multiple available video images on the screen of real-time thumbnail images of the video camera image playback and is dependent upon the number of cameras the dock owner has installed.

FIG. 19 shows a view of an available screen of the dock owner's remote application interface which depicts only the readings from the environmental sensors and battery voltage indication.

FIG. 20 is a view of an available screen of the dock owner's remote application interface with finger-actuated push-able buttons to access the application settings for display mode, date and time, and to manage connections via the internet network of communications.

FIG. 21 shows a view of an autonomous dock equipment installer accessible screen of the remote application interface which depicts finger actuated rotational sliders to move-in or move-out the tractor position.

FIG. 22 shows a view of an autonomous dock equipment installer accessible screen of the remote application interface which depicts a finger actuated rotational slider to skew-left or skew-right the orientation of the dock relative to the shoreline by reeling-in or letting-out winch cables.

FIG. 23 shows a view of an autonomous dock equipment installer accessible screen of the remote application interface which depicts a finger actuated rotational slider to raise the tractor push bar away from the lakebed or lower it toward the lakebed.

DESCRIPTION OF THE PREFERRED EMBODIMENT OF THE INVENTION

Figure 1:
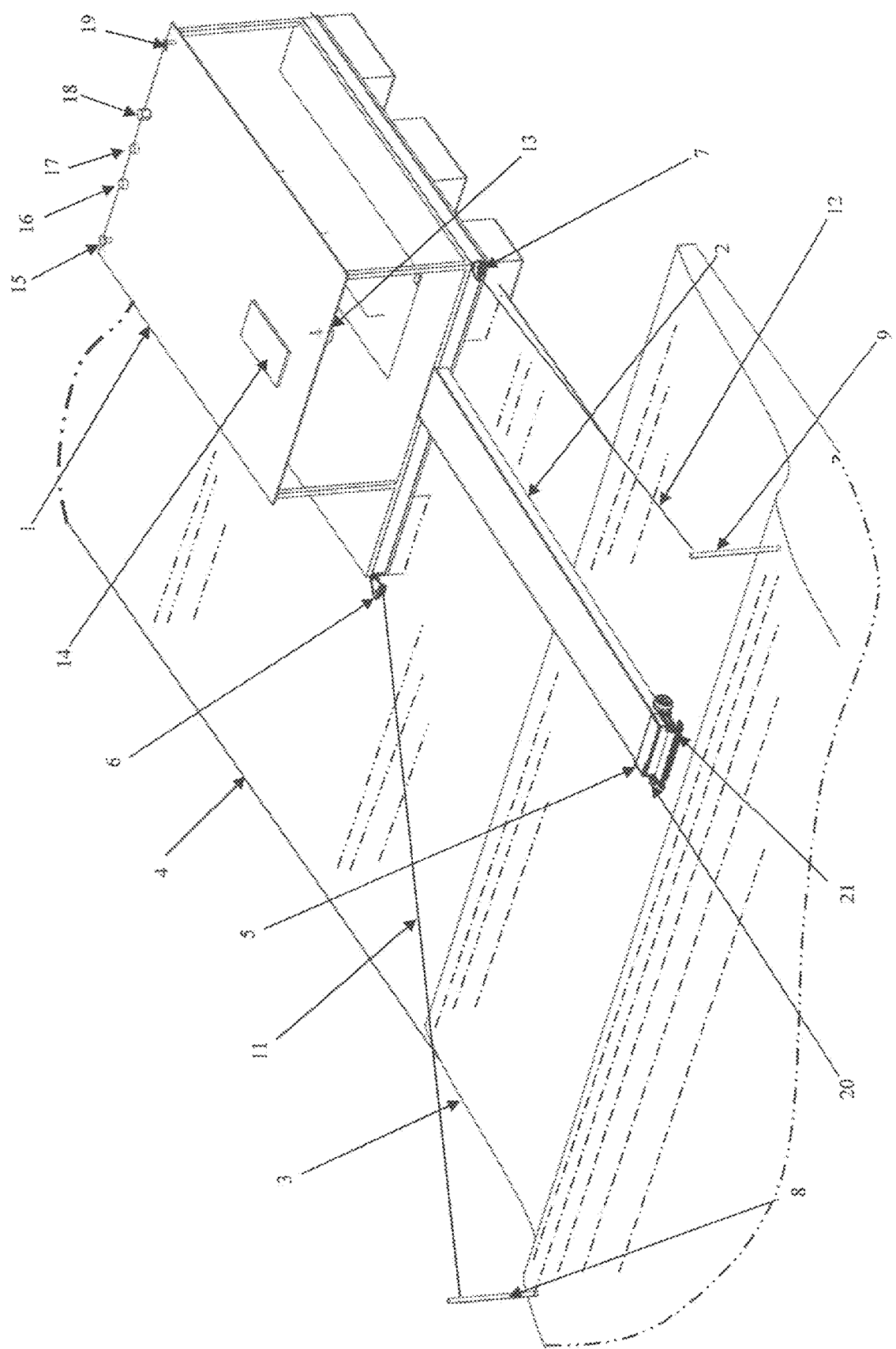
FIG. 1 shows a pictorial view of the robotic, electrically powered tractor mechanism connected to the shore-end of a walkway to a floating dock on the main body of water together with the robotic, electrically powered mooring winch mechanisms on the two closest dock corners. Also depicted is the solar panel on the roof of the floating dock and the various sensors that provide input to the computerized control.

FIG. 1 shows an overall perspective view of a floating dock on a body of water with the embodiment of the tractor attached to the shore-end of the walkway, winches on the dock corners, and the various components that make up the robotic control the system. A floating dock 1 has an attached walkway 2 to permit egress from the shore embankment and beach area 3 onto the dock which floats on a lake or reservoir body of water 4. Attached to the shore-end of walkway is the tractor 5 that moves the walkway and dock. 6 and 7 are the electrical motor-driven winches with cable reels attached to the shore-facing dock corners that are used to control the dock distance from the shoreline and the orthogonality of the dock normal to the shore embankment. 8 and 9 are anchor posts driven into the shore embankment that serves to affix the earth-end of the cables 11 and 12 from the winches. 13 is the location of the weatherproof box on the dock that houses the computer control center, the solar panel charge controller, the communication bridge for the internet connectivity, an accelerometer to sense motion in three axes inside the box, a GPS sensor/signal receiver to send location data to the computer, and wire distribution connections. 14 is a solar panel mounted on the roof to provide a continual charge voltage to the battery. 15 and 16 are a cluster of weather sensors to provide temperature, air pressure and relative humidity data to the computer. 17 is a camera to provide a video feed of the surrounding environment around the dock. 18 is one of a plurality of lights that can be operated by the user via the remote Application interface. 19 is an anemometer to measure wind speed. 20 and 21 are LIDAR sensors to measure the distance from the shore embankment 3 to the tractor drive mechanism 5.

Figure 2:
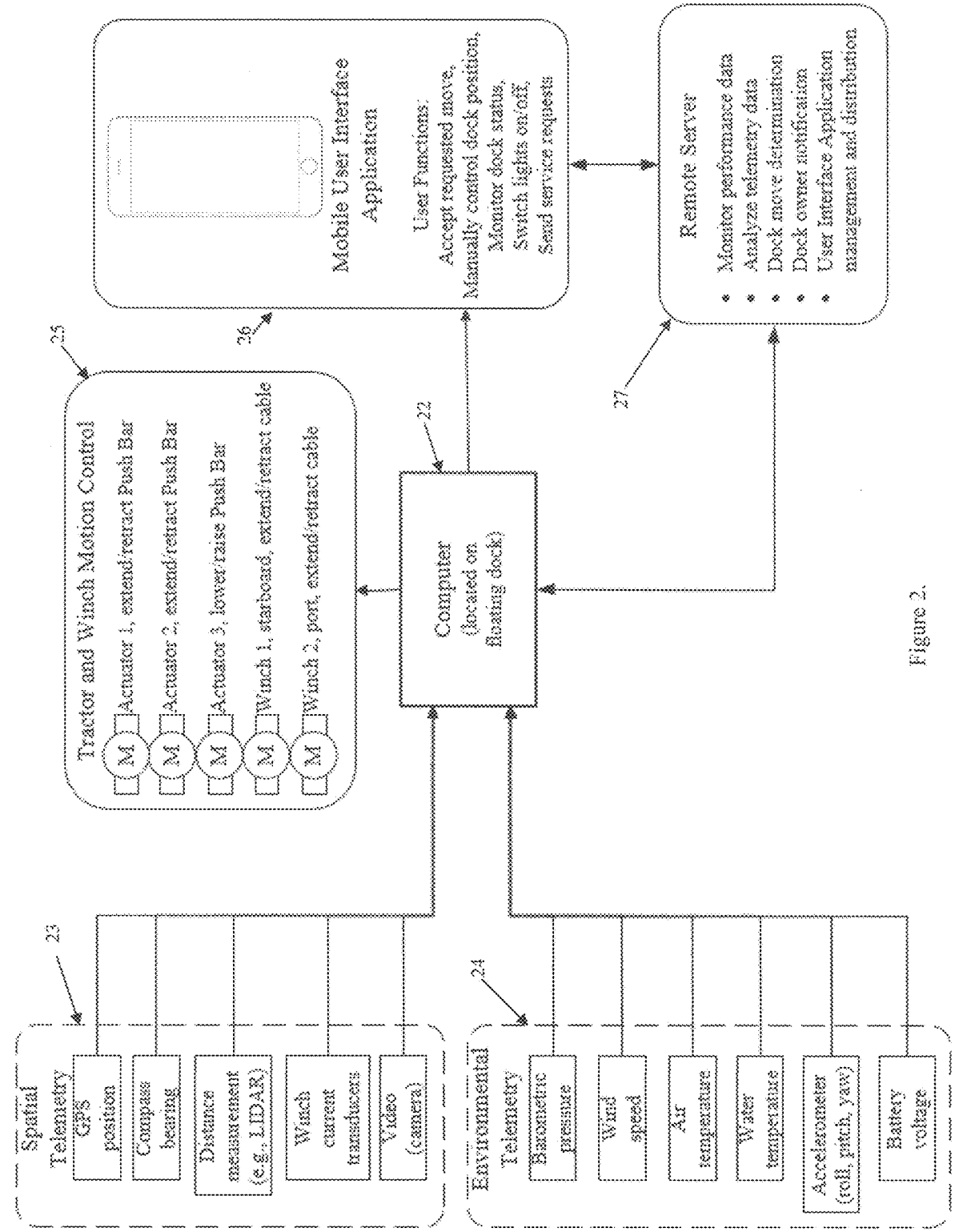
FIG. 2 shows a functional diagram of the system elements to read the various environmental and spatial telemetry inputs to control the powered tractor, winches, dock lighting and video, and provides data to a user-operated software application on a remote device and also in some embodiments sends raw data to a web-based performance monitoring, movement decision control data collection system.

FIG. 2 is a diagrammatic overview of how the computer 22 receives various sensor data inputs and the resultant output commands from processing the data to control the motion of the tractor and winches. Two sets of data consist of spatial telemetry inputs 23 and environmental telemetry inputs 24. Software logic within the computer 22 uses the spatial data to calculate the dock's actual position relative to the desired position and send commands to move it accordingly via the tractor and winches 25 to maintain the appropriate position relative to the defined water depth required by the boat owner. The computer sends sensor data to a mobile application 26 that can be downloaded onto a phone, tablet or computer terminal with internet access. The dock owner can use the mobile application to visually monitor dock status, manually over-ride the control of the dock positions, switch the external lights on or off, and send service requests to the manufacturer. The computer also sends sensor data to a remote server 27 that monitors system performance data, apprehends software updates, performs test routines, and sends maintenance notifications to the dock owner.

Figure 3:
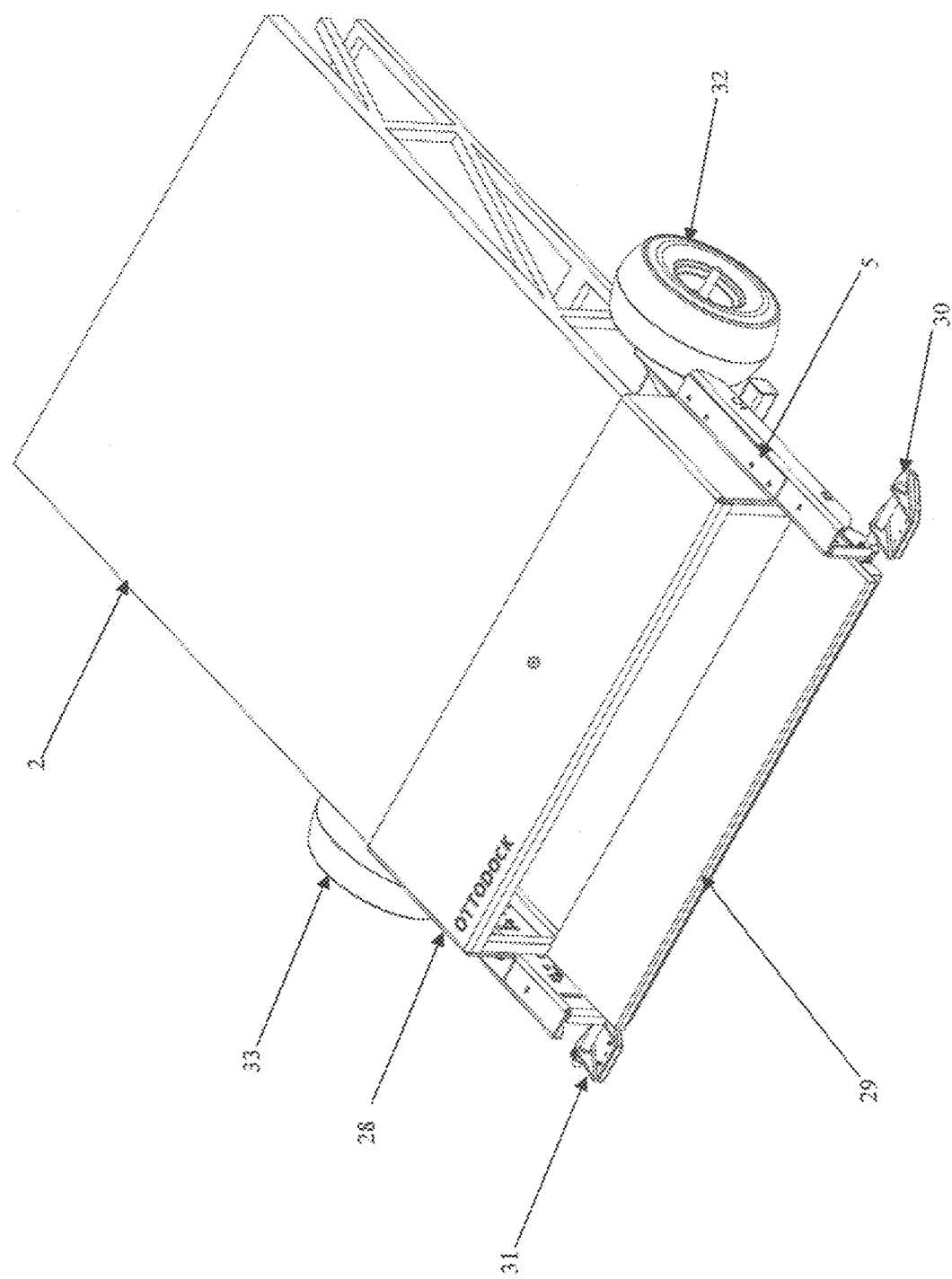
FIG. 3 shows a exterior perspective view of the robotic, electrically powered tractor mechanism connected to the shore-end of a dock walkway with its affixing plate.

FIG. 3 shows a perspective view of the tractor 5 mounted on the end of a dock walkway 2. The top surface of tractor 5 is covered with an enclosure 28 to wrap around and fasten to the walkway thereby retaining it. A step 29 on the front enables a person to step up to the top of the walkway for ease of entry. Skid shoes 30 and 31 permit the tractor to adapt to any angle of a shoreline stairway ramp (see FIG. 8) and slide up or down the surface of the ramp. Wheels 32 and 33 function as rollers for the dock and walkway to be moved when the winches 6 and 7 are actuated to reel-in cables 11 and 12 to move the floating dock closer to the shoreline.

Figure 4:
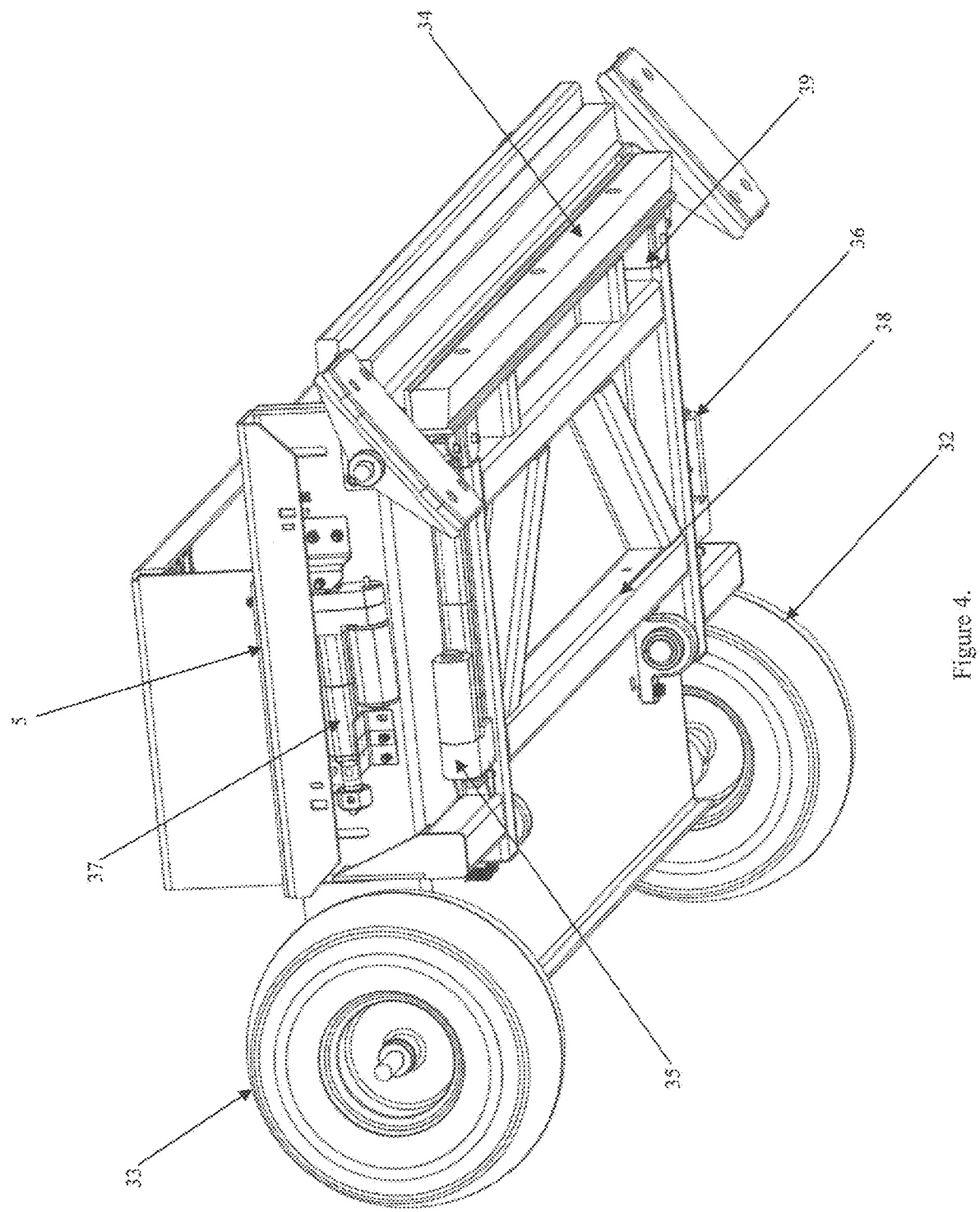
FIG. 4 shows an underside pictorial view of the tractor assembly with its extendable push-bar mechanism and retraction actuators.

FIG. 4 shows a perspective view of the underside of the tractor 5 and free-spinning wheels 32 and 33 together with the push bar 34 that also serves as the floating dock anchor device. Motorized linear actuators 35 and 36 are used to extend the push bar 34 and push against the lakebed ground to move the dock. Motorized linear actuator 37 is used to lift the push bar 34 back into the stowed upward position after actuators 35 and 36 retract the push bar. The push and anchor frame 38 houses the extension links 39 of the push bar 34.

Figure 5:
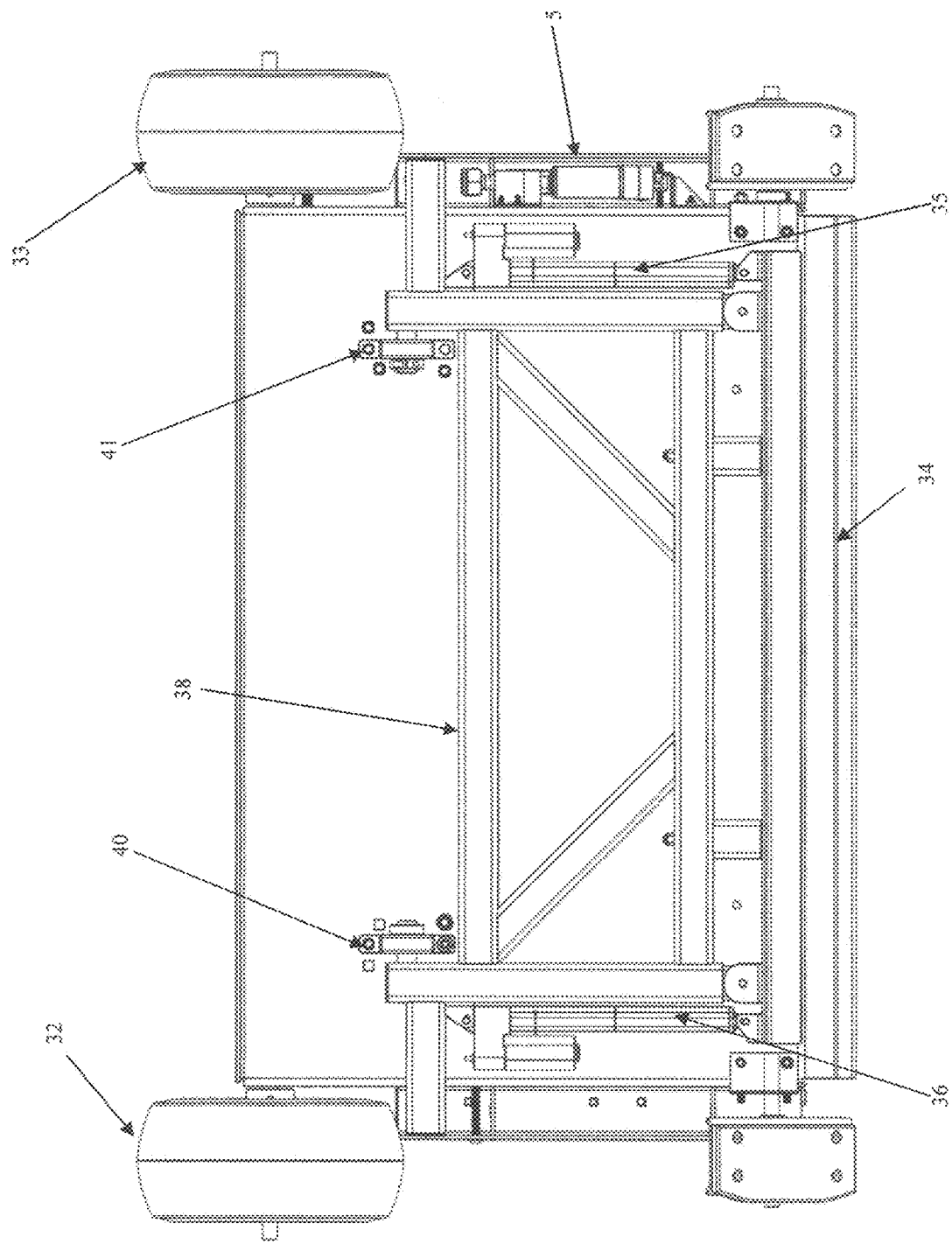
FIG. 5 shows an underside view of the powered tractor drive mechanism with its extendable push-bar mechanism and retraction actuators.

FIG. 5 shows the underside of the tractor 5 with the wheels 32 and 33 oriented parallel to the dock walkway 2 and the push bar 34 in a stowed, upward position to enable moving the floating dock 1 toward the shoreline by actuating the winches 6 and 7 to reel in cable. The push and anchor frame 38 has two hinge pins inside bearings 40 and 41 that provide the means for the frame to rotate downward toward the lakebed or be raised away from the lakebed via actuator 36.

Figure 6:
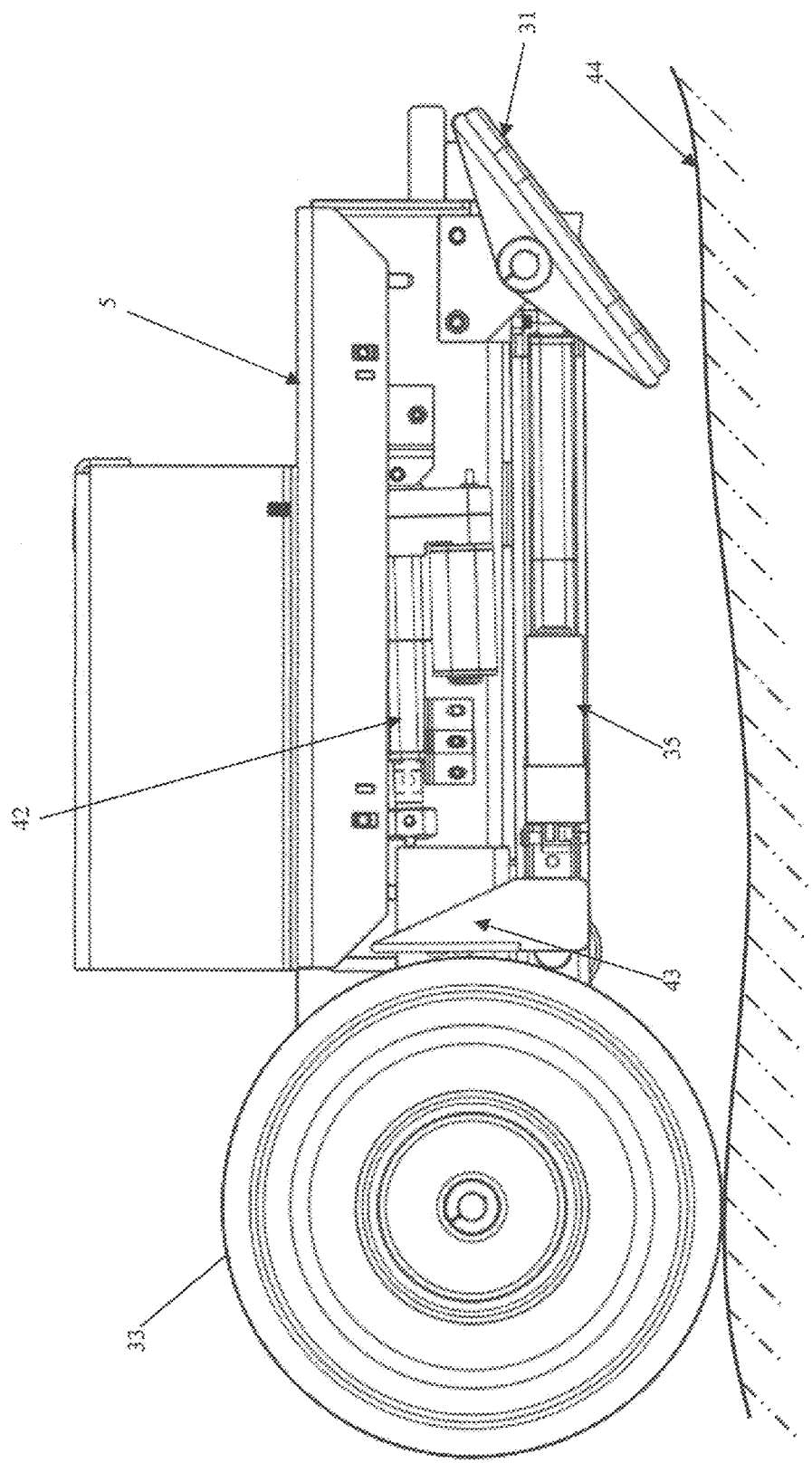
FIG. 6 shows a horizontal side view of the powered tractor drive mechanism with its extendable push-bar mechanism and a retraction actuator that pushes on a lever to raise the push-bar.

FIG. 6 shows a side view of the tractor 5 with wheel 33 resting on the lakebed 44 and actuator 35 in the stowed, upward position to enable moving the floating dock 1 toward the shoreline by actuating the winches 6 and 7 to reel in cable. Actuator 42 extends to push against lever 43 to rotate push and anchor frame 38 into the stowed upward position as shown.

Figure 7:
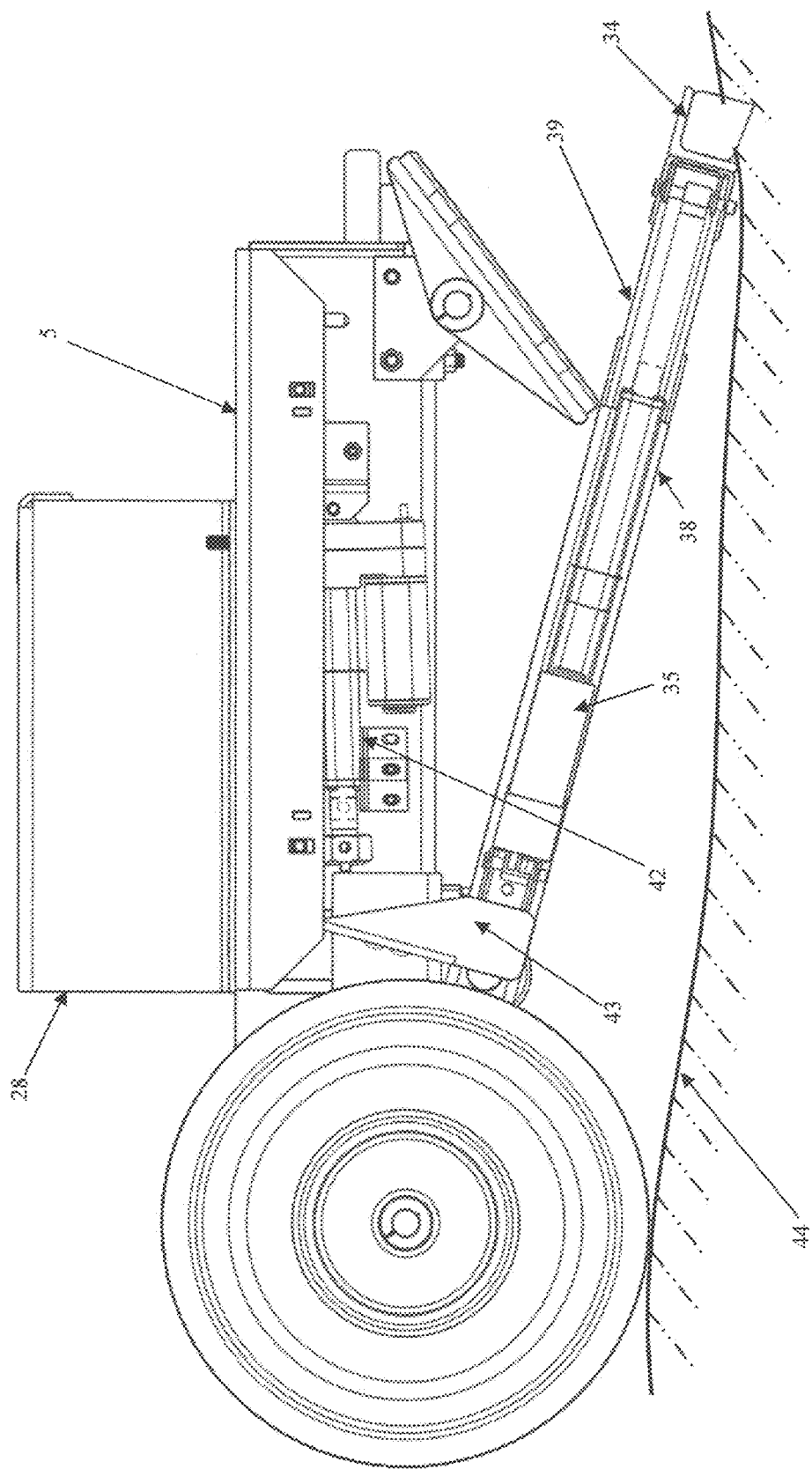
FIG. 7 shows a horizontal side view of the tractor with the push-bar in the downward operational position to function as a fixed anchor point for the floating dock.

FIG. 7 shows a side view of the tractor 5 with actuator 35 and push and anchor frame 38 rotated downward and extending the extension links 39 to move the push bar 34 against the lakebed 44 in a manner that would push floating dock 1 away from the shoreline. In this position then actuator 42 is retracted away from lever 43 to enable welded push and anchor frame 38 to swing downward. This position shown, after extension of 34 against the lakebed, also serves as the fixed anchor point for the floating dock 1.

Figure 8:
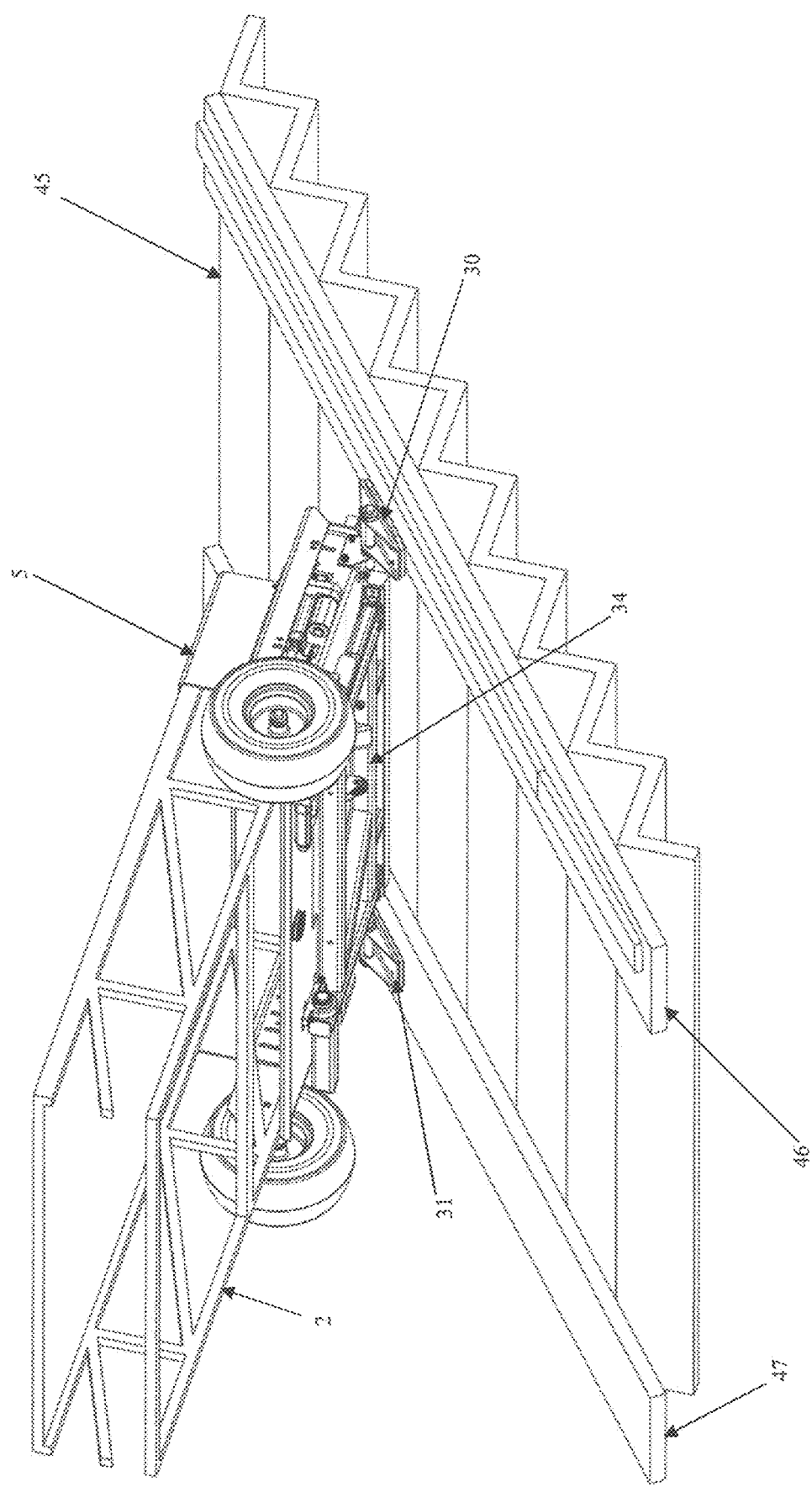
FIG. 8 shows an underside pictorial view of the tractor assembly oriented against a stairway and ramp that is representative of numerous water body shoreline embankments that are reinforced with rip-rap rockwork that have provisions for access stairways and ramps for personnel egress onto the floating dock walkway.

FIG. 8 shows an underside pictorial view of the tractor 5 oriented against a stairway 45 and ramps 46 and 47 on a shoreline embankment with skid shoes 30 and 31 against the angle of the ramps to slide up or down the surface of the ramps. The push bar 34 is shown in the stowed, retracted position.

Figure 9:
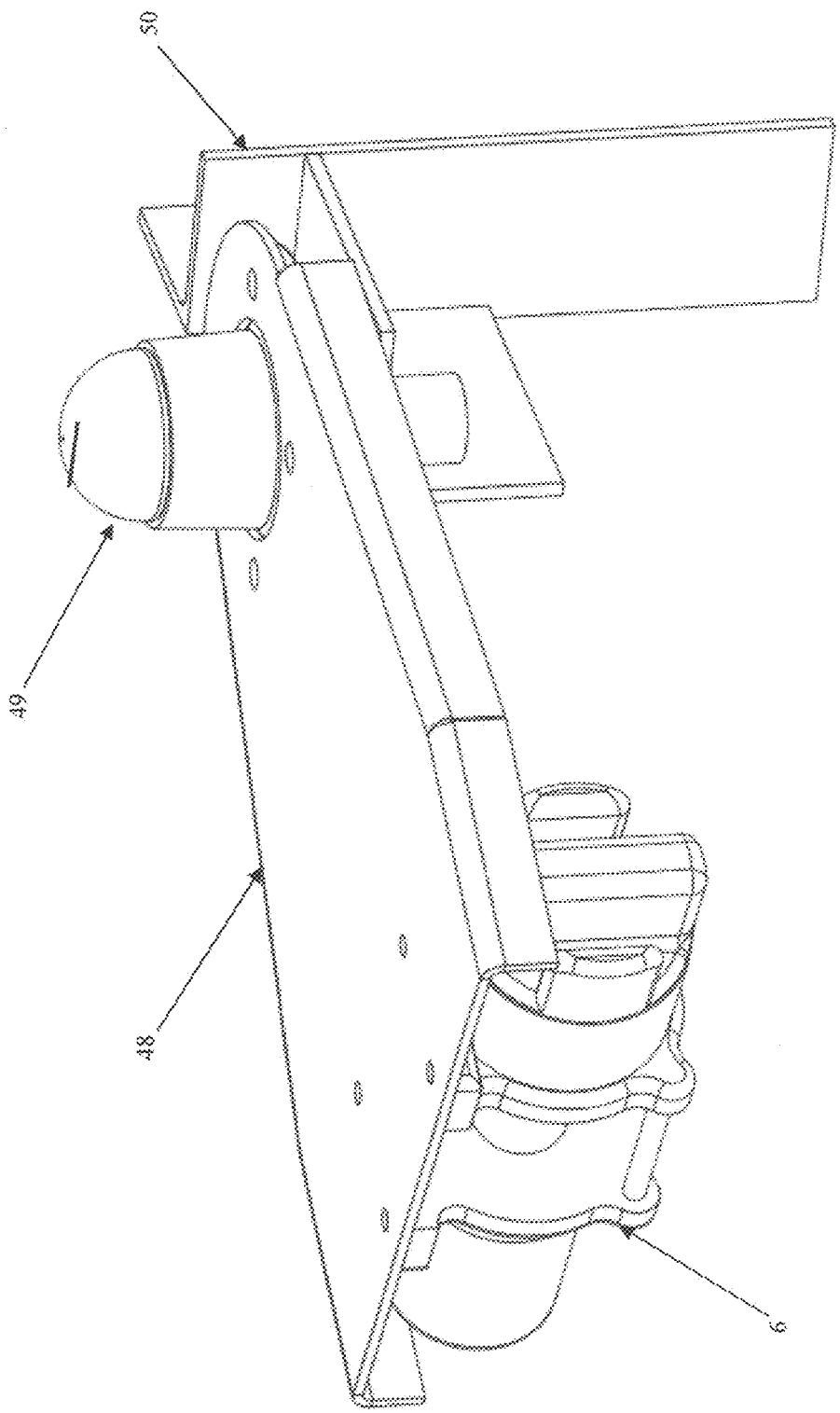
FIG. 9 shows a pictorial view of the components of the preferred electrically powered winch cable mooring mechanism with its mounting bracket and hinge trunnion.

FIG. 9 shows a perspective view of one of the preferred mooring cable winch mechanism 6 that affixes to the corner of floating dock 1. The winch mounting plate 48 is connected to hinge pin 49 that serves as a bearing to permit rotation of the winch to align the cables 11 and 12 with the shore anchor posts 8 and 9. The assembly of the winch 6 and winch mounting plate 48 is bolted to the corner of floating dock 1 with the angle bracket 50.

Figure 10:
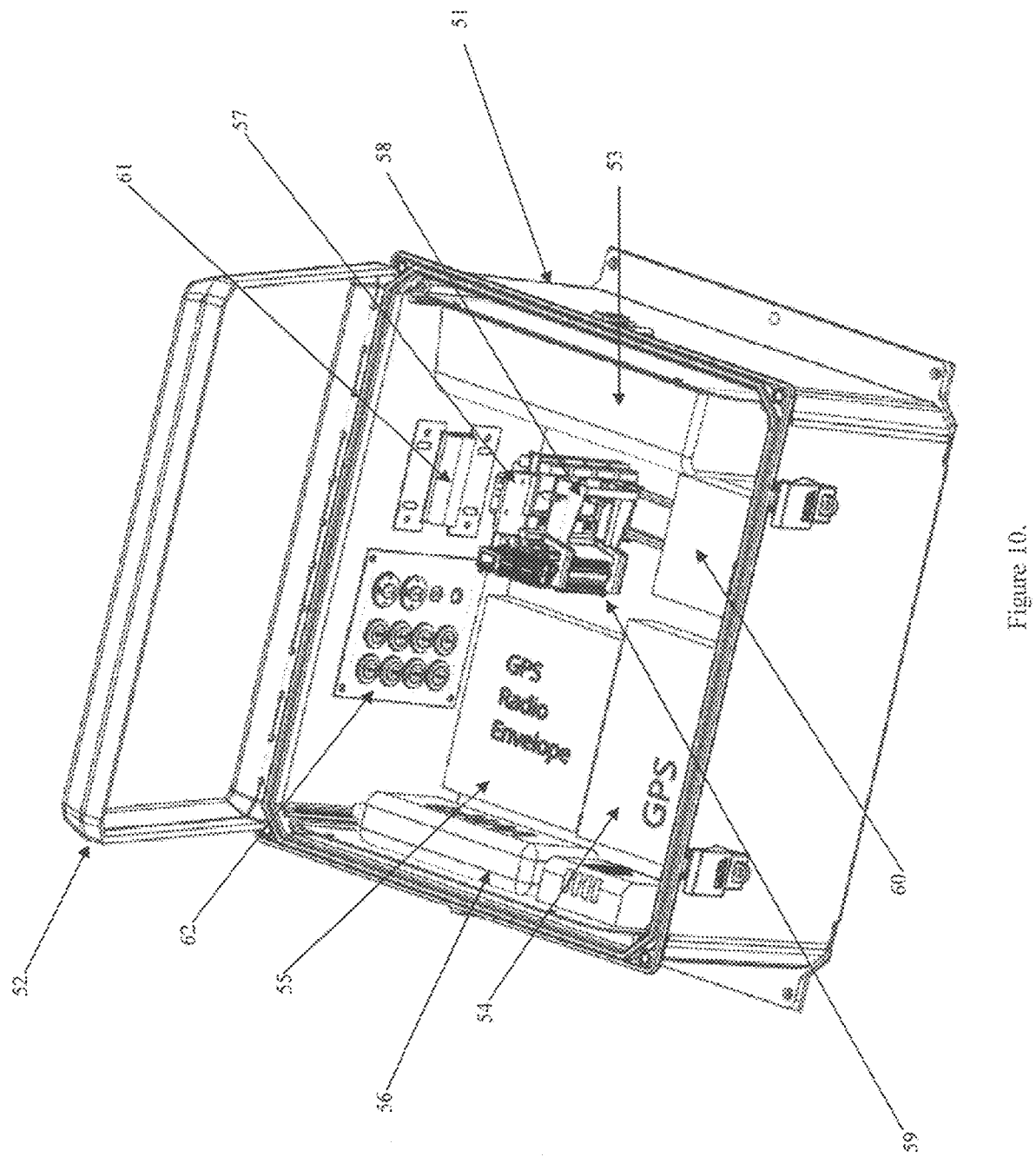
FIG. 10 shows the enclosure that houses the components of the computer and electrical power distribution system.

FIG. 10 shows the computer and electrical power distribution system enclosure 51 with the lid 52 in the open position. The solar panel charge controller 53 is mounted within the enclosure, together with the Global Navigation Satellite System (GNSS) receiver 54 and 55 and internet access point 56. The commercial computer circuit card (with installed software logic) mounts on circuit card support 57 and the lighting control circuit card mounts on circuit card support 58. The five volt dc power supply for the computer circuit card is item 59. The wires from these components are routed to the fused channel bus 60 connectors, then divided to the relay boards 61, and then routed to the row of exit connectors 62. An exterior wire harness connects to the exit ports of connectors 62 on the back of enclosure 51 to route to the various telemetry sensors, video camera, dock lights, battery, tractor, and winch power.

Figure 11:
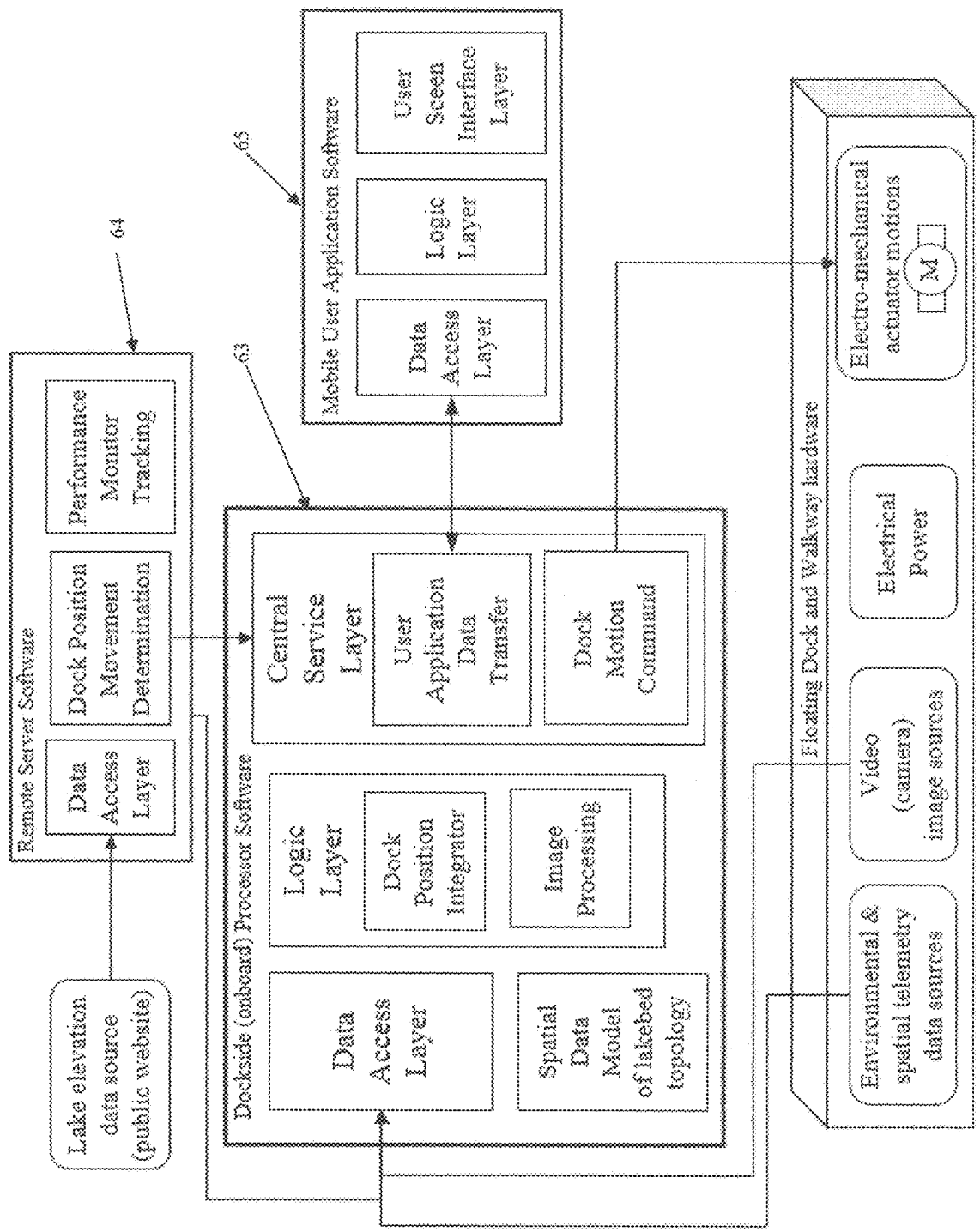
FIG. 11 depicts a diagram of the software architecture that reads the various exterior sensor inputs, makes logical decisions about the need and distance to move the floating dock, send requests for approval to move to the dock owner via the internet connected device, and then sends commands to the tractor and winches.

FIG. 11 depicts an overview of the software architecture that is used to receive and interpret environmental sensor data, logically actuate and control the dock motion, maintain network connectivity, and manage the DC power. The software comprises three parts: the software on the dock computer shown in block 63, the software 64 that resides on a remote server, and the software 65 that is downloaded onto a hand-held portable device with a User Interface (UI) such as a phone, tablet, or computer. The software on the dock computer receives the water depth and elevation data from the software on the remote server plus other dockside environmental inputs, and directs the commands, based on a stored Spatial Data Model of the local lakebed topography parameters, to notify the dock owner that the floating dock needs to move, and controls autonomous functionality of the tractor 5 and winches 6 and 7 via the motion command software running on the computer subsystem mounted on the floating dock 1.

The software facilitates dock motion as follows:

a) To facilitate autonomous movement of the dock towards or away from the shore, the dock owner will be notified via the UI application that environmental and spatial conditions are such that a dock "Move-In" or "Move-Out" is recommended. This request is triggered by a change in water level that is obtained from two independent sources: data from the public website that reports the current lake level, and the calculated altitude of the dock based on raw GPS data collected from the dockside onboard GNSS receiver 54. When the water level deviation exceeds a predetermined height referenced by Mean Sea Level (MSL), as compared to the last dock movement and the topology of the lake bottom along the dock centerline, a "Request to Move" function in the Central Service layer of the computer 63 is invoked.

The UI application will display a notification that a dock "Move-In" or "Move-Out" is requested, and a live camera view of the gangway, shore line and winch lines will be presented to the user. When the user authorizes a "Move-In" or "Move-Out" request, a confirmation message is sent to a remote server (Cloud) software 64 and then relayed to the motion command software 63 on the floating dock. When the "Move-In" or "Move-Out" request is received the motion command software program executes pre-defined program steps until the dock reaches the desired location. A string of serial data is sent to the winch motor controller that invokes a Pulse Width Modulated (PWM) positive or negative value be sent simultaneously for a fixed time interval to both the port and starboard winches. This command results in rotations of the winch cable spool which relieves or tightens some of the land facing load on the tractor push bar 34. This cable tensioning action moves the entire floating dock and gangway towards or allows the dock to move away from the land in coordination with the tractor unit. When the dock has achieved its final position, the command software program actuates the Push Bar 34 into the lakebed ground to serve as an anchor then the winch tightening action is completed to secure the floating dock position. During the execution of the "Move-In" or "Move-Out" routine, dock movement status updates are displayed in the UI application. A polling service function in the UI application executes ongoing requests to the motion command software program while the "Move-In" or "Move-Out" routine is being performed. The motion command software program responds to the UI application polling service with the following states: Stable (no current movement is being performed), or Moving (one or more of the winch/push/pull/retract/extend dock move management functions are currently running), or Finished (provides an "all clear" that the dock move management functions have terminated for the associated "Move-In" or "Move-Out" request).

b) To enable manual user controlled movement of the dock either towards or away from the shore, the dock owner selects the "Dock Control" routine on the remote UI Application. When the "Move-In" or "Move-Out" button is pressed by the user, then the command software executes pre-defined program steps to move the dock to the desired location. The server based software will determine the change in lake level from the web-based lake level data, then, using the stored lakebed topography data, the software will calculate how much distance the floating dock needs to be moved to make the adjustment. The motion command software running on the onboard microcontroller receives the "Move-In" or "Move-Out" request from the UI and executes the "Move-In" or "Move-Out" control sequence. A string of serial data is sent to the winch motor controller that invokes PWM positive or negative values be sent for fixed time intervals to both the port and starboard winches which results in rotations of the cable spool to remove or increase some of the land facing load on the push bar 34. During the execution of the "Move-In" or "Move-Out" routine, dock movement status updates are displayed in the UI application. A polling service function in the UI application executes ongoing requests to the motion command software program while the "Move-In" or "Move-Out" routine is being performed. The motion command software program responds to the user application polling service with the following states: Stable (no current movement is being performed), or Moving (one or more of the winch/push/pull/lift/anchor dock move management functions are currently running), or Finished (provides an "all clear" notice that the dock move management functions have terminated for the associated manual "Move-In" or "Move-Out" request).

c) To enable manual user controlled movement of the dock either yawed right or yawed left to align the floating dock in a perpendicular orientation to the shoreline, the user selects the "Dock Control" routine on the remote UI application. When the "Skew Right" or "Skew Left" button is pressed by the user then the command software executes pre-defined program routine steps to move the dock to the desired location. Upon selection of the "Skew Right" or "Skew Left" button by the user, the following actions are performed: The command software program running on the onboard microcontroller receives the "Skew Right" or "Skew Left" request from the user application and executes the "Skew Right" or "Skew Left" control sequence. A string of serial data is sent to the winch motor controller that invokes Pulse Width Modulated positive or negative values be sent for a fixed time interval to both the port and starboard winches. This command results in rotations of the cable spool, changing the cable tension to increase or remove some of the land facing load which moves the entire dock assembly and gangway towards to the right or left of the centerline perpendicular to the shoreline. During the execution of the "Skew Right" or "Skew Left" routines, dock movement status updates are displayed in the user application. A polling service function in the user application executes ongoing requests to the command software program while the "Skew Right" or "Skew Left" routine is being performed. The command software program responds to the user application polling service with the following states: Stable (no current movement is being performed), or Moving (one or more of the winch/push/pull/lift/anchor dock move management functions are currently running), or Finished (provides an "all clear" notice that the dock move management functions have terminated for the associated manual "Skew Right" or "Skew Left" request).

Should the average wind speed ever be higher than a predetermined threshold for safe movement as monitored by the anemometer mounted on the floating dock, or the instantaneous wind speed be a set percentage greater than the hourly average, the user will be notified via the UI application dialog that a move is not possible at that time. Data collected and analyzed from the onboard Inertial Measurement Unit (IMU) will be used to determine the average Roll, Pitch, and Yaw (RPY) of the floating dock. Should the average RPY acceleration of the dock assembly be greater than a predetermined threshold for safe movement, or an instantaneous RPY be a set percentage greater than the hourly average, the dock owner will be notified via the user application dialog that a move is not possible at that time.

FIG. 12 is a database table that stores dock movement increments and preserves historical records as an aggregation of information. Each dock is identified with a unique serial number in the database where lakebed topology, minimum allowable water depth, and positional tolerances are maintained 66. This allows the software 64 to manage each dock independently based on current spatial and environmental conditions. A record of movement history and UI response are tracked as well in 67. The software 64, on an internet connected server, functions as the central collection point for telemetry data from all docks utilizing this system of autonomous positioning control and stores this data are stored in a database table, see FIG. 12.

Software 64 utilizes an algorithm to calculate the current water depth at the dock location, gangway distance from shore, and the GPS latitude and longitude of the dock structure to determine if a move can be performed and provide adequate water depth for boat operation. When the user acknowledges the request to "Move-In" or "Move-Out" or "Skew Right" or "Skew Left" message, software 64 initiates a live video stream from the dock's on-board video camera directed to the UI and, once the video stream is established, software 64 waits for the user authorization to move the dock. Upon receipt of a move authorization, software 64 responds by sending a packet of dock control data that contains instructions for the on-board microcontroller to actuate the winches and or push mechanism to achieve the desired dock location. The software will also make automatic adjustments in the lateral positioning of the dock and gangway to ensure that the gangway maintains positioning along the centerline of the gangway and the onshore benchmark. This will be done by automatically making small incremental skews in yaw either left or right as required to keep the dock along the centerline. During the move process the user is provided with feedback messages that display the current state of the dock and, when the move is complete, the user is notified that the dock is secured and stable. Also prior to and during the move process an audible warning and light will be activated on the dock to warn anybody in the area to be careful during the move. The live video stream is provided to the UI directly from the dock during the dock move routine. Upon the completion of each dock move, software 64 receives and analyzes the new spatial data from the dock (magnetic bearing, distance from shore, deviation from the centerline, and latitude/longitude) and registers it as an additional entry in the table of FIG. 12 for each dock serial number. Should an additional adjustment be needed after the initial move is made, software 64 will respond with subsequent iterations of alignment and positioning moves until the dock is located within pre-defined tolerances for magnetic bearing alignment of the dock walkway centerline and distance from the shore.

Figure 13:
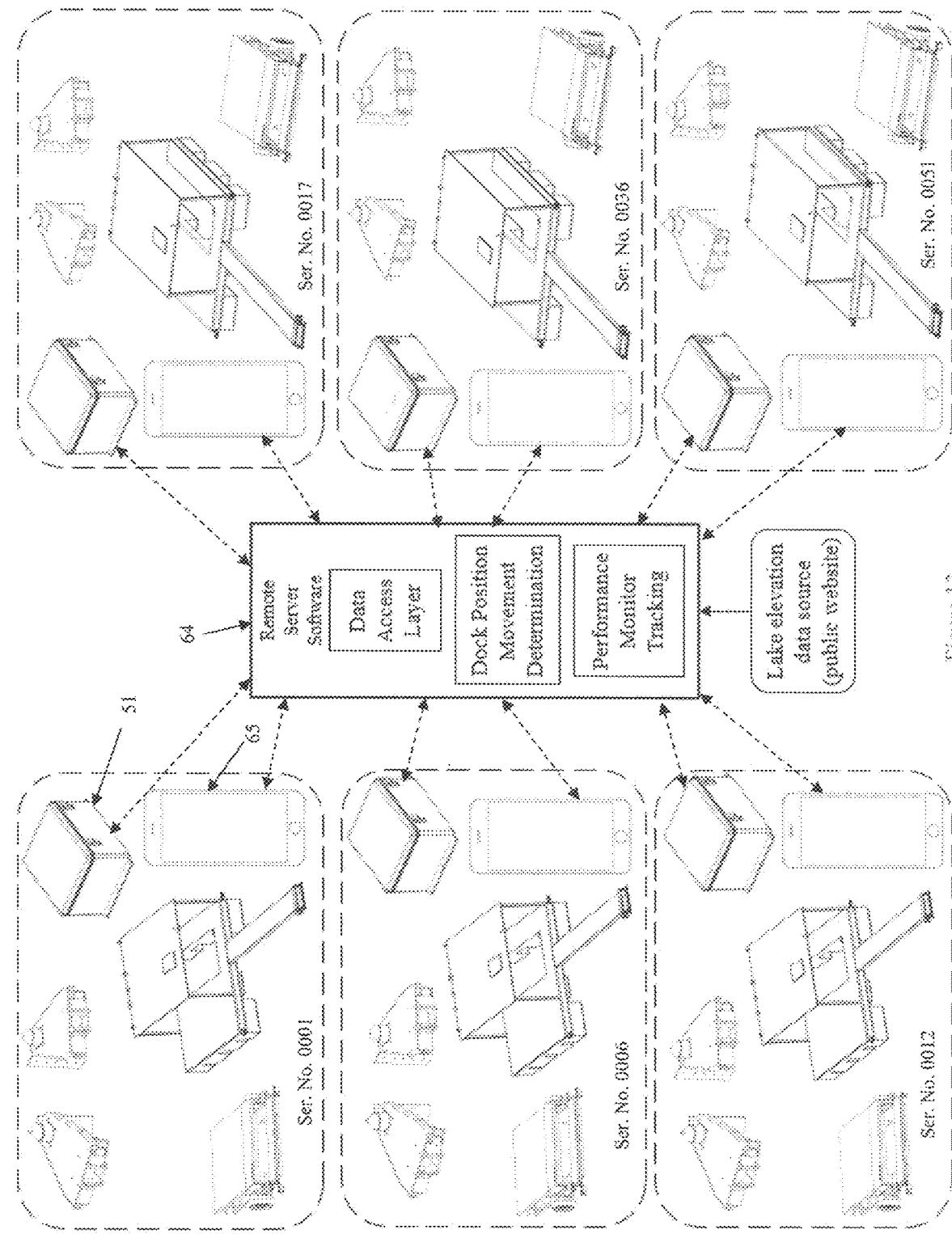
FIG. 13 depicts a plurality of autonomous dock positioning systems that could be located on different geographical bodies of water and that are interconnected via the internet network of communications.

FIG. 13 depicts a plurality of docks with autonomous positioning systems that could be located on different geographical bodies of water and that are interconnected via the internet network of communications to software 64 that is the electronic service provider running on remote servers to transmit at least one service request signal to a UI device 65. The request signal indicates at least one dock position or more needs servicing provided by the dockside movement control components (winches and tractor). If multiple docks that reside on a single body of water have these movement control components installed, then a coordinated motion of docks could be achieved as the water level rises and falls if nearly simultaneous UI movement authorization response is received; or each dock moves according to the timing of the UI response frequency.

Figure 14:
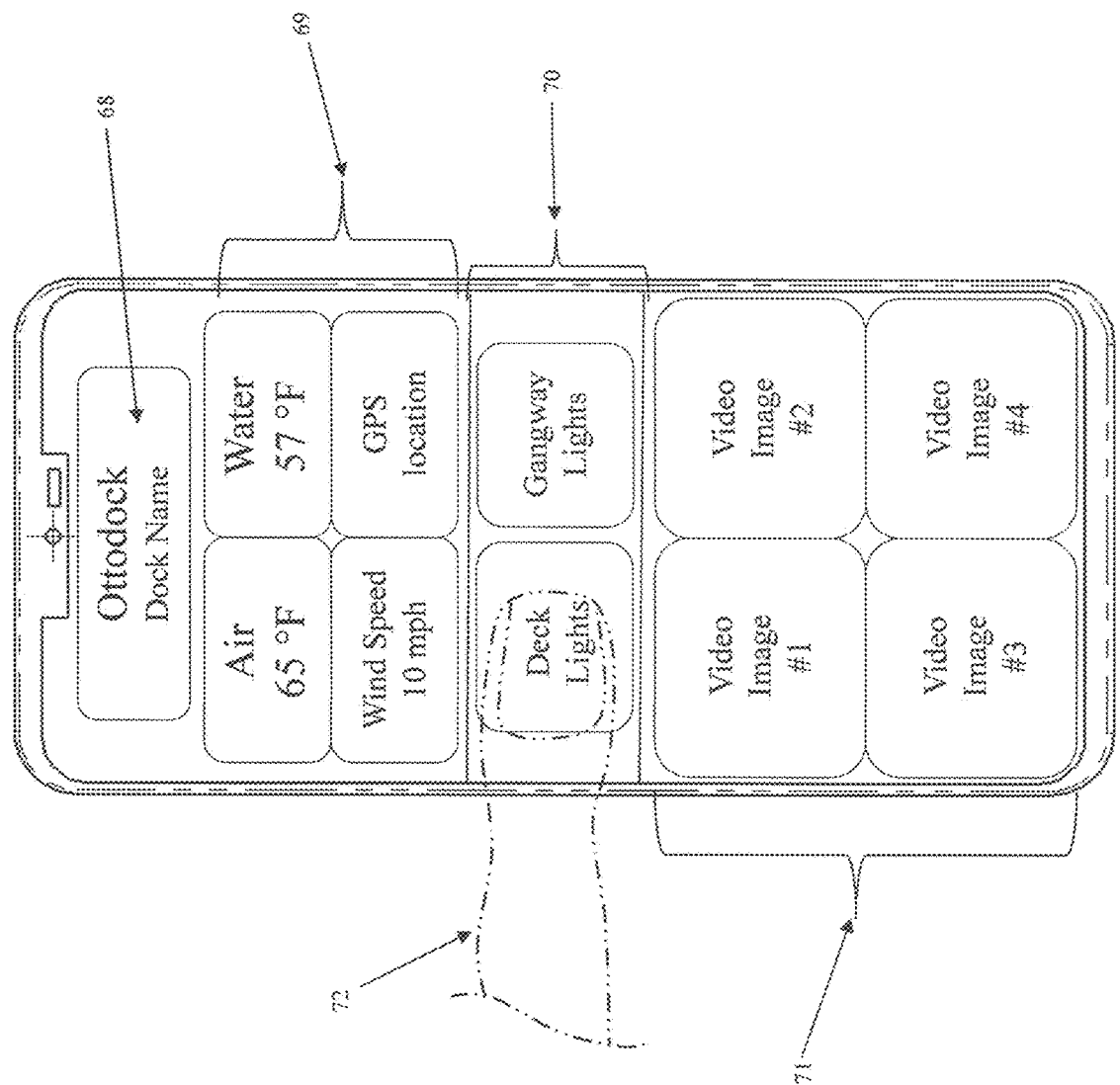
FIG. 14 shows a view of the first (home) screen of multiple screens available on the dock owner's user remote application interface that operates with the computer for a user (customer) to monitor the dock environment and manually operate the tractor and winches. Subsequent Application screens can be accessed by pressing a button with a finger or swiping a finger across the screen.

FIG. 14 shows an embodiment of the first (home) screen of the remote application UI that a user would utilize to access the functionality of the mobile application. A dock owner's name, or the name of one of many docks that a user owns, is shown in bar 68 at the top of the display. The user can monitor the weather conditions of the immediate dockside surrounding environment by observing the four rectangular button readings of 69. When the user taps any one of the four active icon buttons of 69 with a finger gesture pressing downward on the screen, then a separate window opens up on the screen as shown in the image of FIG. 19 with a more complete list of the monitored environmental parameters to observe. There is a scroll bar 70 across the middle of the screen which a user can slide with the swipe of a finger, from left toward right and then back again from right toward left, to access the dockside lighting controls. When the user taps any one of the lighting buttons of 70 with a finger gesture pressing downward on the screen, then a separate window opens up on the screen as shown in the image of FIG. 17 with finger actuated rotational sliders that regulate light brightness from off through full bright. There is a block 71 of a plurality of video images taken from a plurality of video cameras that are mounted on the owner's floating dock. When the user taps any one of the video image buttons of 71 with a finger gesture pressing downward on the screen, then a separate window opens up on the screen as shown in the image of FIG. 18 of an enlarged single video image.

Figure 15:
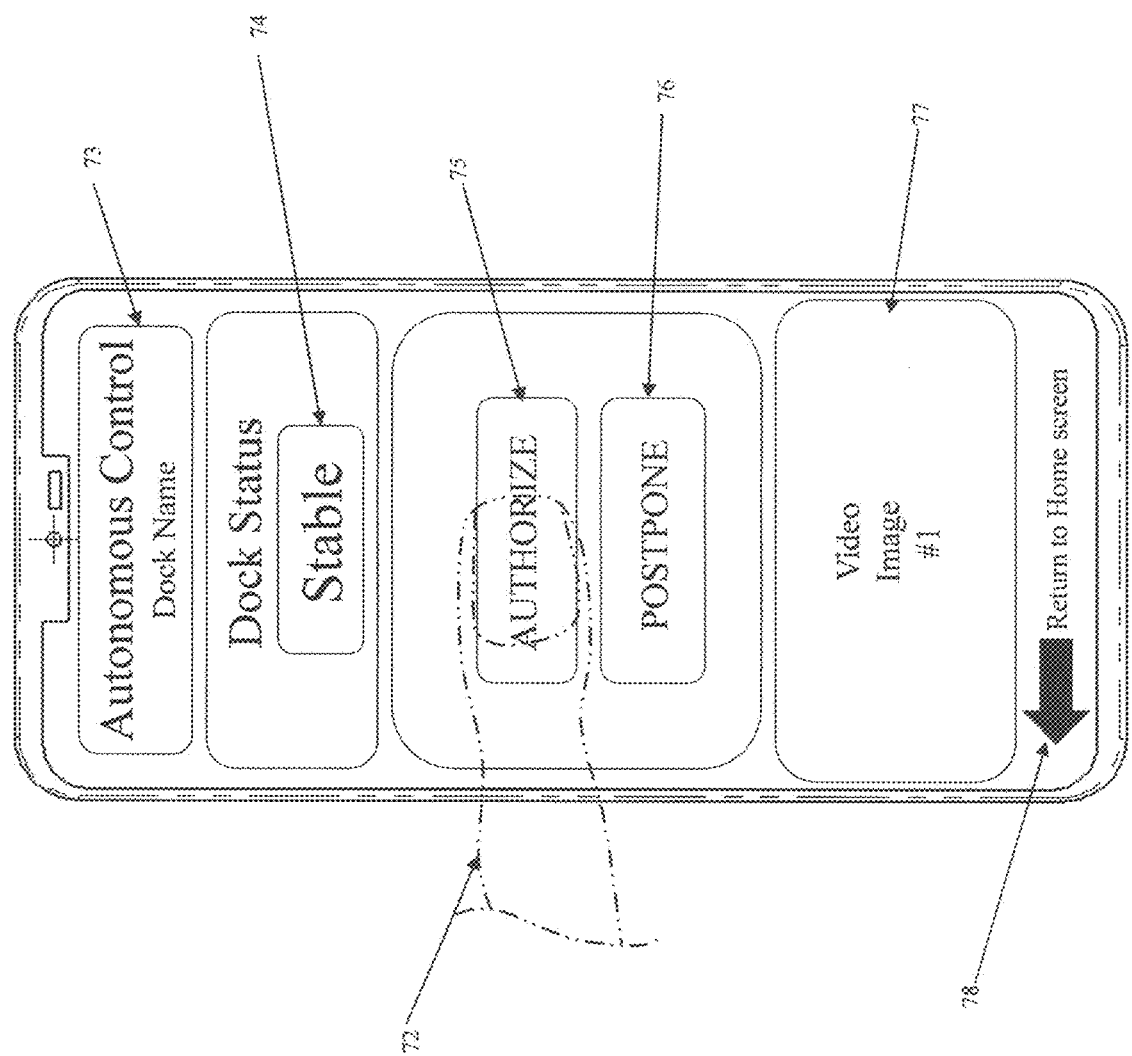
FIG. 15 is a view of the second available screen of the dock owner's remote application interface which depicts the screen for a user to authorize or postpone autonomous floating dock movements.

FIG. 15 shows an example of the second screen of the remote application UI that would require a user to acknowledge any present computer system initiated dock status alert indication 74 and then authorize or postpone the movement of the floating dock. The indicator 74 may display either "Move-In", "Move-Out", "Skew Right", or "Skew Left", or "Finished" once the move is complete, or "Stable" if no move is required. A finger gesture 72 is used to tap either the "Authorize" button 75 for the system to automatically move the dock, or the "Postpone" button 76 if the user wishes to delay the dock movement. Block 73 indicates that the system is under "autonomous Control" and displays the dock name or the name of one of many docks that a user owns. Block 77 is a video image taken from one of the video cameras that are mounted on the owner's floating dock so that the owner may readily observe the dock motion while the system moves it. A finger gesture 72 is used in a sliding motion at the bottom of the screen 78 to return to the Home screen shown in FIG. 14.

Figure 16:
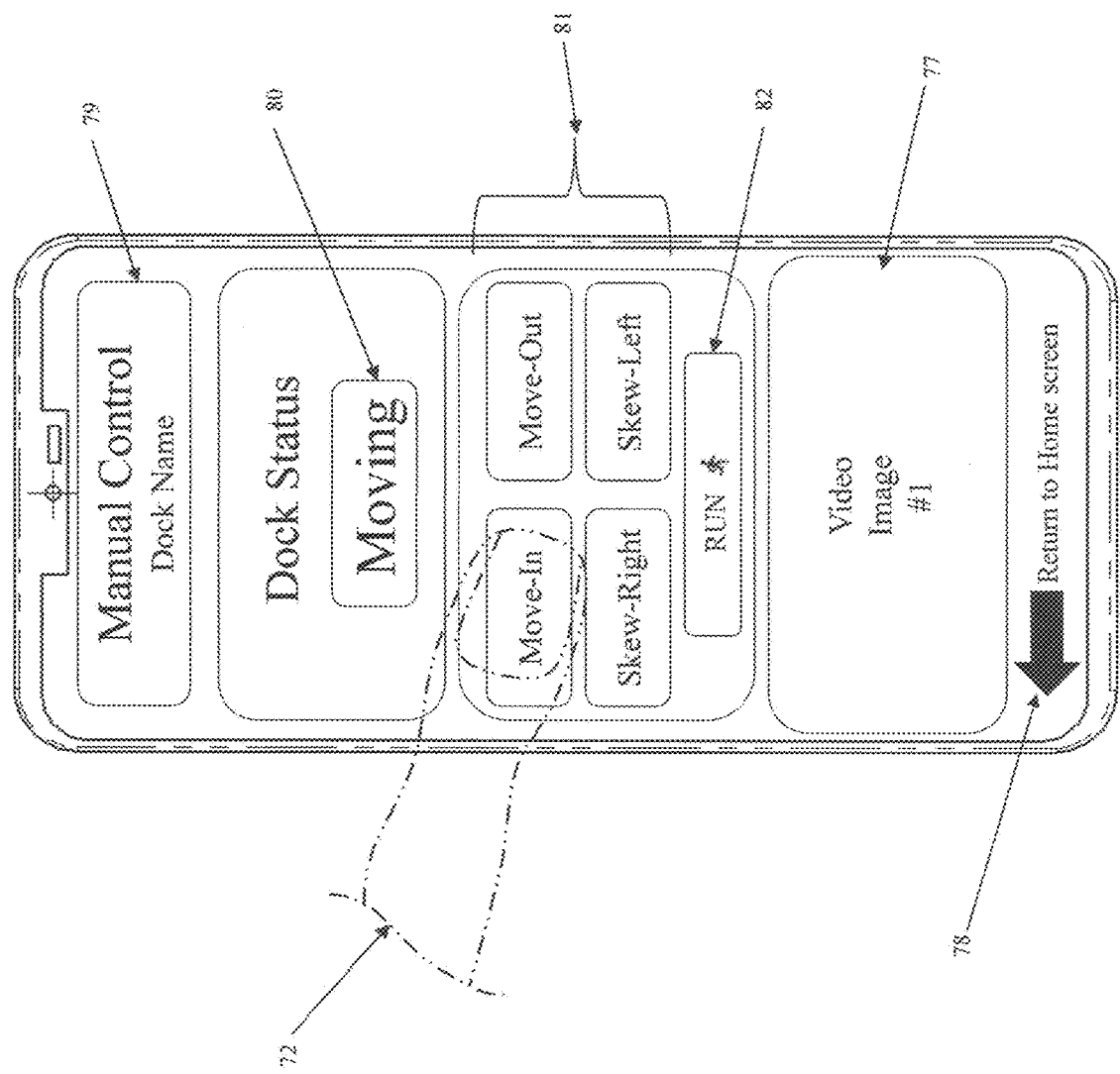
FIG. 16 is a view of the third available screen of the dock owner's remote application interface which depicts the screen for a user to manually move the floating dock by operating the tractor or winches.

FIG. 16 shows an example of the third screen of the remote application UI that a user to manually control the movement of the floating dock and is labeled "Manual Control" with the dock name in block 79. The dock status indicator 80 would display "Moving" during manual control. A finger gesture 72 is used to tap the either the "Move-In", "Move-Out", "Skew Right", or "Skew Left" function tabs in 81, depending on the type of move required, followed by tapping the "Run" button 82. Once "Run" 82 is pushed then a pre-programmed increment of movement occurs to the floating dock. Block 77 is a video image taken from one of the video cameras that are mounted on the owner's floating dock so that the owner may readily observe the dock motion while the system moves it. A finger gesture 72 is used in a sliding motion at the bottom of the screen 78 to return to the Home screen shown in FIG. 14.

FIG. 17 shows a view of the fourth available screen of the dock owner's remote application interface which depicts finger 72 actuating rotational sliders 83 and 84 that are rotated in a clockwise direction to increase the intensity of lights that are installed on the floating dock. Rotation in the counterclockwise direction reduces the light intensity. A finger gesture 72 is used in a sliding motion at the bottom of the screen 78 to return to the Home screen shown in FIG. 14.

FIG. 18 is a view of the fifth available screen of the dock owner's remote application interface with a full-screen video camera image 85 playback from the dock owner's selected video link tab from the screen tabs 71 of FIG. 14. A finger gesture 72 is used in a sliding motion at the bottom of the screen 78 to return to the Home screen shown in FIG. 14.

FIG. 19 is a view of the sixth available screen of the dock owner's remote application interface with a display of the environmental indicators 86 through 91. The display of this screen appears when from the dock owner selects a tab from the screen tabs 69 of FIG. 14. The displays that are available include air temperature 86, water temperature 87, wind speed 88, GPS location 89, barometric pressure 90, and the dock's battery voltage 91. A finger gesture 72 is used in a sliding motion at the bottom of the screen 78 to return to the Home screen shown in FIG. 14.

FIG. 20 is a view of the seventh available screen of the dock owner's remote application interface with a display of the active icon functions that are settable by the user. These include "Set Display" 92 to adjust the brightness of the display icons and change the setting of the dock name, "Set Theme" 93 to allow changing the background image of the application display to a number of user electable water-themed images, "Set Date & Time" 94 for a user to select the appropriate month/day/year setting and time-zone appropriate daytime, and "Manage Connections" 95 for a user to select the appropriate wifi enabled network link code, add other wifi enabled devices, and add other docks. A finger gesture 72 is used in a sliding motion at the bottom of the screen 78 to return to the Home screen shown in FIG. 14.

FIG. 21 is a view of an available screen of the remote application interface that is only accessible to the installer of the autonomous dock control equipment and that displays the active icon functions that are available for the installer to use a finger gesture that rotationally slides a dial to either "Move-In" 96 or "Move-Out" 97 the tractor push bar. A finger gesture 72 is used in a sliding motion at the bottom of the screen 78 to return to the Home screen shown in FIG. 14.

FIG. 22 is a view of an available screen of the remote application interface that is only accessible to the installer of the autonomous dock control equipment and that displays the active icon function that is available for the installer to use a finger gesture that rotationally slides a dial to either "Skew-Right" 98 or "Skew-Left" 99 the winch cable reels. A finger gesture 72 is used in a sliding motion at the bottom of the screen 78 to return to the Home screen shown in FIG. 14.

FIG. 23 is a view of an available screen of the remote application interface that is only accessible to the installer of the autonomous dock control equipment and that displays the active icon function that is available for the installer to use a finger gesture that rotationally slides a dial to either "Lower Push Bar" 100 or "Raise Push Bar" 101 the tractor push bar. A finger gesture 72 is used in a sliding motion at the bottom of the screen 78 to return to the Home screen shown in FIG. 14.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

We claim:

1. An automated dock positioning system for use on a body of water with a shore, comprising:
    a) a floating dock assembly;
    b) a walkway attached at a distal end to the floating dock assembly;
    c) a push bar disposed on an underside of the walkway configured to extend downwardly to provide movement to and/or a temporary anchor point for the automated dock positioning system; and,
    d) at least one motorized linear actuator in operable communication with, and configured to reversibly extend, the push bar to push against a ground surface to move the floating dock assembly.

2. The automated dock positioning system of claim 1, further comprising a push and anchor frame disposed on the underside of the walkway and to which the push bar is attached.

3. The automated dock positioning system of claim 2, wherein the push and anchor frame is configured for reversible downward rotation with a plurality of hinge pins, each hinge pin located inside a bearing.

4. The automated dock positioning system of claim 2, further comprising at least one lever attached to the push and anchor frame, wherein rotation of the push and anchor frame is achieved by an actuator extending against or retracting from the lever.

5. The automated dock positioning system of claim 1, further comprising at least one motorized linear actuator configured to lift the push bar into a stowed, upward configuration.

6. The automated dock positioning system of claim 1, wherein a major axis of the push bar extends parallel to a minor axis of the walkway.

7. The automated dock positioning system of claim 1, further comprising at least one motorized winch mechanism.

8. The automated dock positioning system of claim 7, wherein the at least one motorized winch mechanism is disposed on the floating dock body and connected to at least one anchor post located on the shore by a reel-in cable.

9. The automated dock positioning system of claim 7, further comprising a software-programmed computer adapted for controlling the operation of at least one of the walkway, the push bar and the at least one motorized winch mechanism to effectuate the positioning of the floating dock body relative to the shore.

10. The automated dock positioning system of claim 9, wherein the software-programmed computer is operable remotely.

11. The automated dock positioning system of claim 10, wherein the software-programmed computer is operable remotely using a software-programmed mobile device in operable communication with the software-programmed computer.

12. The automated dock positioning system of claim 9, further comprising at least one environmental and or spatial monitoring sensor in operable communication with the software-programmed computer to influence positioning of the floating dock body relative to the shore based on data received from the at least one sensor.

13. A method of using an automated dock positioning system on a body of water with a shore, comprising:
    moving the automated dock positioning system by extending a push bar, disposed on an underside of a walkway, to influence the walkway attached to a floating dock body to position the floating dock body, wherein the push bar is configured to extend downwardly to provide a temporary anchor point during moving.

14. The method according to claim 13, further comprising activating an actuator to retract from or engage a lever to effectuate downward or upward rotation, respectively, of a push and anchor frame on which the lever attached.

15. The method according to claim 13, further comprising activating an actuator operably connected to the push bar by at least one extension link to extend or retract the push bar.

16. The method according to claim 13, further comprising using at least one motorized winch mechanism disposed on the floating dock body in combination with a tractor attached to the walkway and the push bar to position the floating dock body.

17. The method according to claim 16, wherein the positioning using the tractor, push bar and the at least one motorized winch is performed automatically by a software-programmed computer.

18. The method according to claim 17, wherein the positioning is based on data received from at least one environmental and or spatial monitoring sensor in operable communication with the software-computer.

19. The method according to claim 17, wherein operation of the software-programmed computer is remotely controlled by a user.

* * * * *